US009476902B2

(12) United States Patent
Temko et al.

(10) Patent No.: US 9,476,902 B2
(45) Date of Patent: *Oct. 25, 2016

(54) METHODS, APPARATUSES, AND SYSTEMS FOR MEASURING THE AMOUNT OF MATERIAL DISPENSED FROM A CONTAINER USING AN ACCELEROMETER

(71) Applicant: Capton, Inc., Irvine, CA (US)

(72) Inventors: Seth W. Temko, Prospect Heights, IL (US); Charles L. Zimnicki, Lake Zurich, IL (US); Walter V. Raczynski, Arlington Heights, IL (US)

(73) Assignee: Capton, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/099,865

(22) Filed: Dec. 6, 2013

(65) Prior Publication Data

US 2014/0095103 A1   Apr. 3, 2014

Related U.S. Application Data

(63) Continuation of application No. 12/688,839, filed on Jan. 15, 2010, now Pat. No. 8,608,026, and a continuation of application No. 12/383,462, filed on Mar. 23, 2009, now abandoned.

(Continued)

(51) Int. Cl.
*G01P 15/00* (2006.01)
*B67D 3/00* (2006.01)
*G01F 13/00* (2006.01)

(52) U.S. Cl.
CPC ............. *G01P 15/00* (2013.01); *B67D 3/0051* (2013.01); *B67D 3/0054* (2013.01); *B67D 3/0077* (2013.01); *G01F 13/00* (2013.01)

(58) Field of Classification Search
CPC .... G01P 15/00; G01P 15/003; G01P 15/005; B67D 3/0051; B67D 3/0054; B67D 3/0077; G01F 13/00; G01F 13/008
USPC .............. 222/1, 23, 30, 40, 41, 52, 638–641
See application file for complete search history.

(56) References Cited

U.S. PATENT DOCUMENTS 3,170,597 A   2/1965   Reichenberger
3,920,149 A   11/1975  Fortino et al.
(Continued)

FOREIGN PATENT DOCUMENTS

EP   0726225    7/2008
GR   10035148   1/2001
(Continued)

OTHER PUBLICATIONS

\* Patent Cooperation Treaty, "International Preliminary Examination Report", PCT Application No. PCT/US02/0743, mailed Dec. 7, 2003.

(Continued)

*Primary Examiner* — J. Casimer Jacyna
(74) *Attorney, Agent, or Firm* — Fish & Tsang, LLP

(57) ABSTRACT

The application discloses a device that determines how much material is dispensed from a container by measuring the angle at which the container is tilted. The device includes an accelerometer for measuring an angle by which the container is tilted, and an electronic component for transmitting data based on the angle measured by the accelerometer. In some embodiments, the accelerometer measures the angle by which the container is tilted at a multiple different times.

12 Claims, 30 Drawing Sheets

Related U.S. Application Data

(60) Provisional application No. 61/274,110, filed on Mar. 23, 2009, provisional application No. 61/038,765, filed on Mar. 23, 2008, provisional application No. 61/038,767, filed on Mar. 23, 2008.

(56) References Cited

U.S. PATENT DOCUMENTS

| | | | |
|---|---|---|---|
| 4,278,186 | A | 7/1981 | Williamson |
| 4,327,784 | A | 5/1982 | Denniston |
| 4,433,795 | A | 2/1984 | Maiefski et al. |
| 4,736,871 | A | 4/1988 | Luciani et al. |
| 5,051,920 | A | 9/1991 | Reams et al. |
| 5,255,819 | A | 10/1993 | Peckels |
| 5,279,481 | A | 1/1994 | Trotter et al. |
| 5,291,004 | A | 3/1994 | Frank et al. |
| 5,379,916 | A | 1/1995 | Martindale et al. |
| 5,505,349 | A | 4/1996 | Peckels |
| 5,603,430 | A * | 2/1997 | Loehrke ............... B67D 1/0888 222/1 |
| 6,036,055 | A | 3/2000 | Mogadam et al. |
| 6,354,468 | B1 * | 3/2002 | Riek ............... B67D 3/0051 222/129.3 |
| 6,504,481 | B2 | 1/2003 | Teller |
| 6,606,602 | B1 | 8/2003 | Kolls |
| 6,669,051 | B1 | 12/2003 | Phallen et al. |
| 6,718,311 | B1 | 4/2004 | Suo-Anttila |
| 6,892,166 | B2 | 5/2005 | Mogadam |
| 7,003,406 | B2 | 2/2006 | Mogadam |
| 7,196,624 | B2 | 3/2007 | Teller |
| 7,202,780 | B2 | 4/2007 | Teller |
| 7,260,504 | B2 | 8/2007 | Mogadam |
| 7,272,537 | B2 | 9/2007 | Mogadam |
| 7,750,817 | B2 | 7/2010 | Teller |
| 7,900,799 | B2 | 3/2011 | Kuzar et al. |
| 8,116,993 | B2 | 2/2012 | Cebulski |
| 2002/0070861 | A1 * | 6/2002 | Teller ............... B67D 1/1405 340/572.1 |
| 2004/0041709 | A1 | 3/2004 | Forster |
| 2005/0200490 | A1 | 9/2005 | Teller |
| 2006/0080050 | A1 | 4/2006 | Zimmermann et al. |
| 2006/0265151 | A1 | 11/2006 | DuHack et al. |
| 2007/0205203 | A1 | 9/2007 | Temko |
| 2007/0208541 | A1 | 9/2007 | Temko |
| 2007/0214055 | A1 | 9/2007 | Temko |
| 2008/0033666 | A1 | 2/2008 | Mogadam |
| 2008/0033697 | A1 | 2/2008 | Mogadam |
| 2008/0114488 | A1 | 5/2008 | Mogadam |
| 2008/0114489 | A1 | 5/2008 | Mogadam |
| 2008/0133150 | A1 | 6/2008 | Mogadam |
| 2008/0195251 | A1 | 8/2008 | Milner |
| 2009/0048706 | A1 | 2/2009 | DeLine |
| 2009/0114675 | A1 | 5/2009 | Kuzar et al. |
| 2010/0038378 | A1 | 2/2010 | Gabler et al. |
| 2010/0312103 | A1 | 12/2010 | Gorek et al. |
| 2011/0180563 | A1 | 7/2011 | Fitchett et al. |

FOREIGN PATENT DOCUMENTS

| | | |
|---|---|---|
| WO | 02/072468 | 9/2002 |
| WO | 2007/103830 | 9/2007 |

OTHER PUBLICATIONS

* Patent Cooperation Treaty, "International Search Report", PCT Application No. PCT/US02/0743, mailed Oct. 30, 2002.
* Patent Cooperation Treaty, "International Preliminary Examination Report", PCT Application No. PCT/US07/63238, mailed Sep. 9, 2008.
* Patent Cooperation Treaty, "International Search Report", PCT Application No. PCT/US07/63238, mailed Mar. 27, 2008.

* cited by examiner

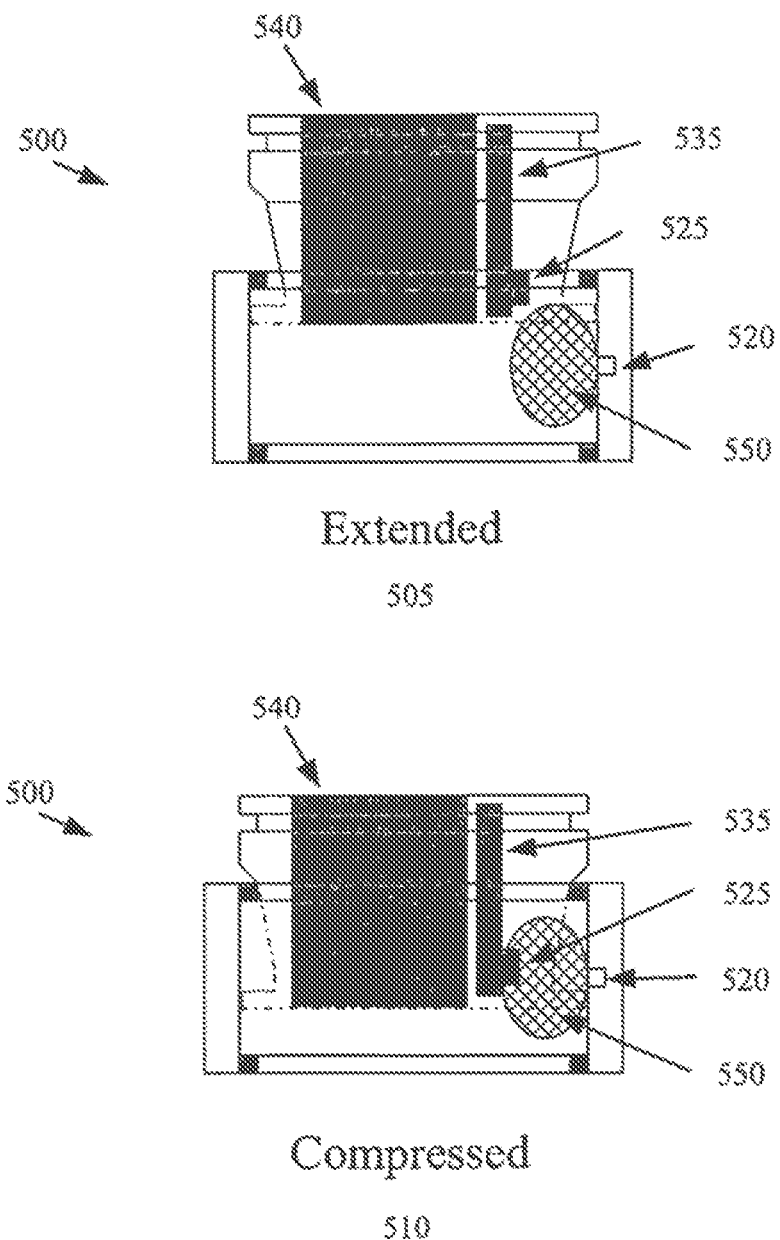

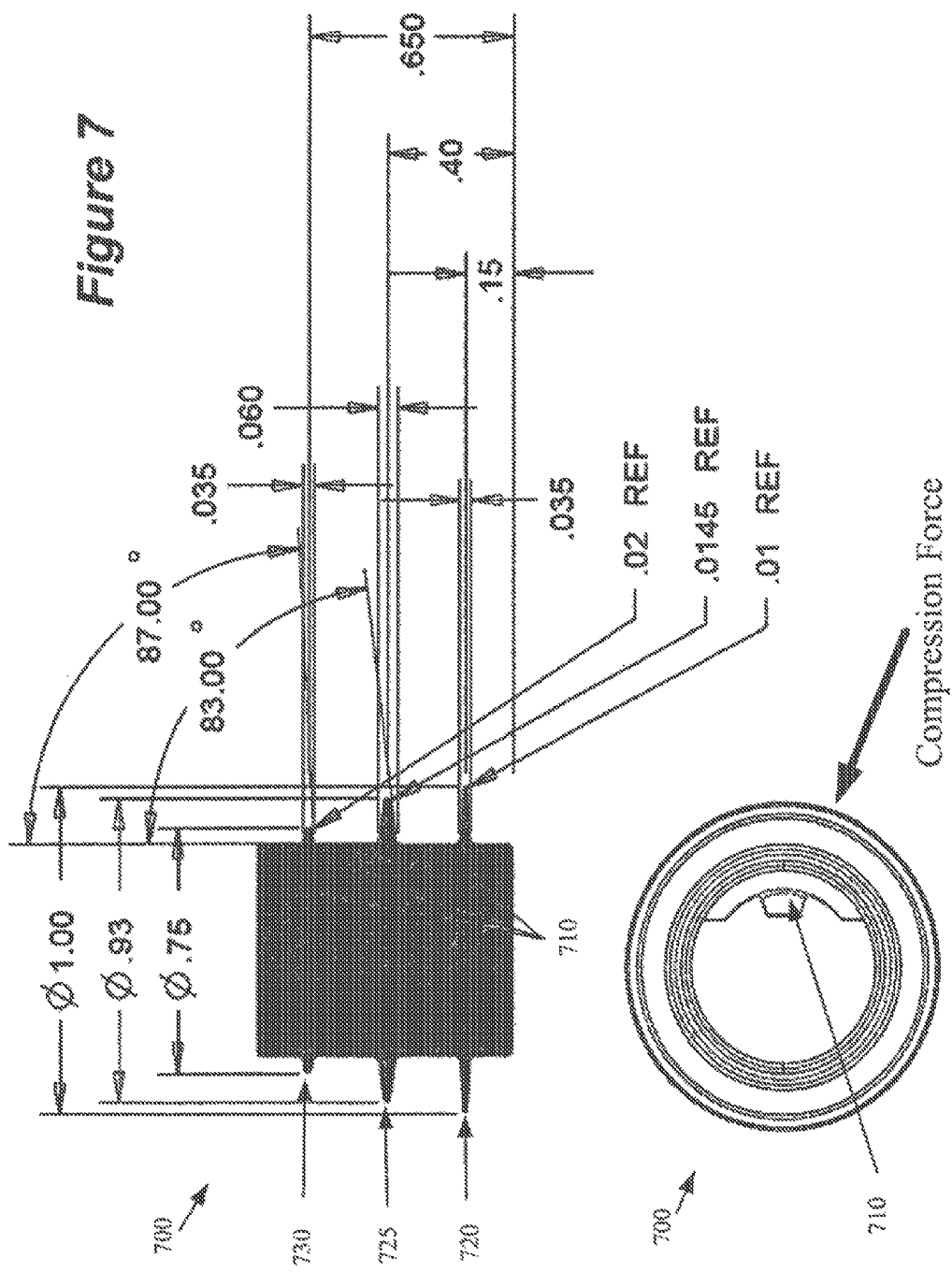

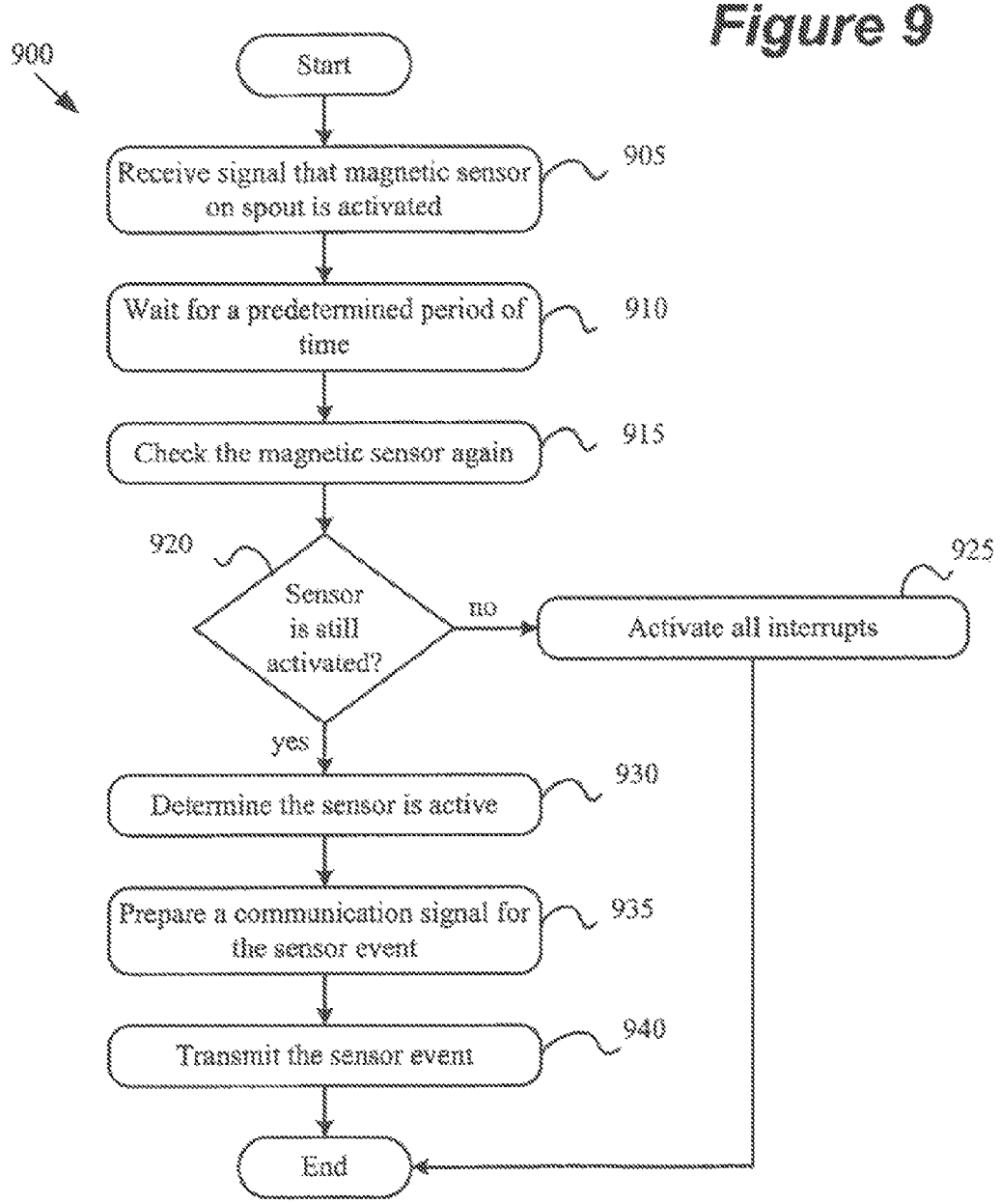

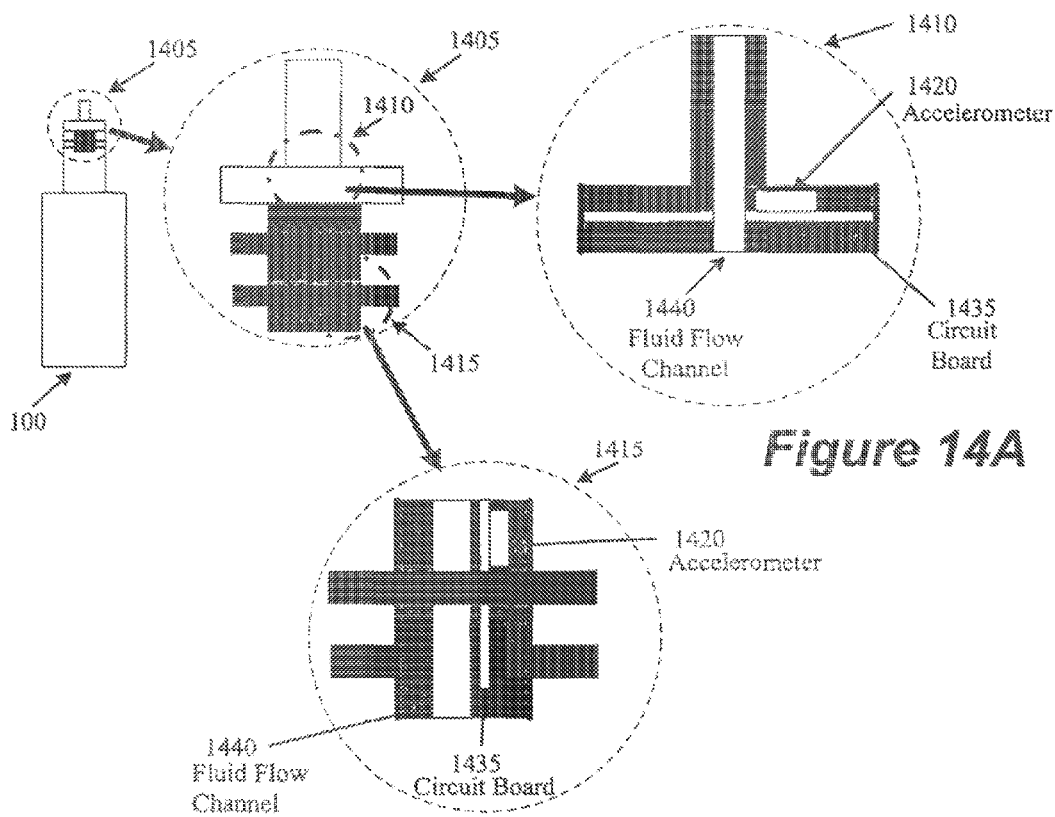
*Figure 14A*
*Figure 14B*
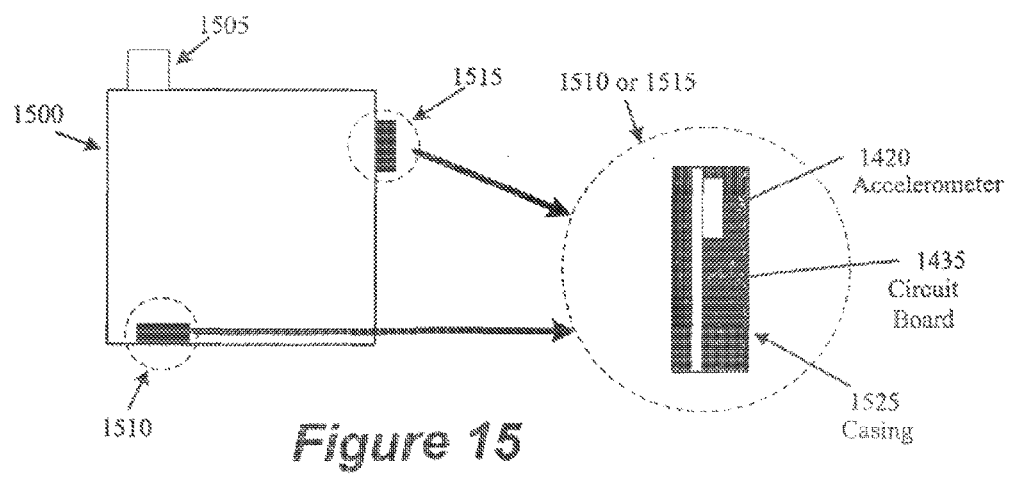
*Figure 15*

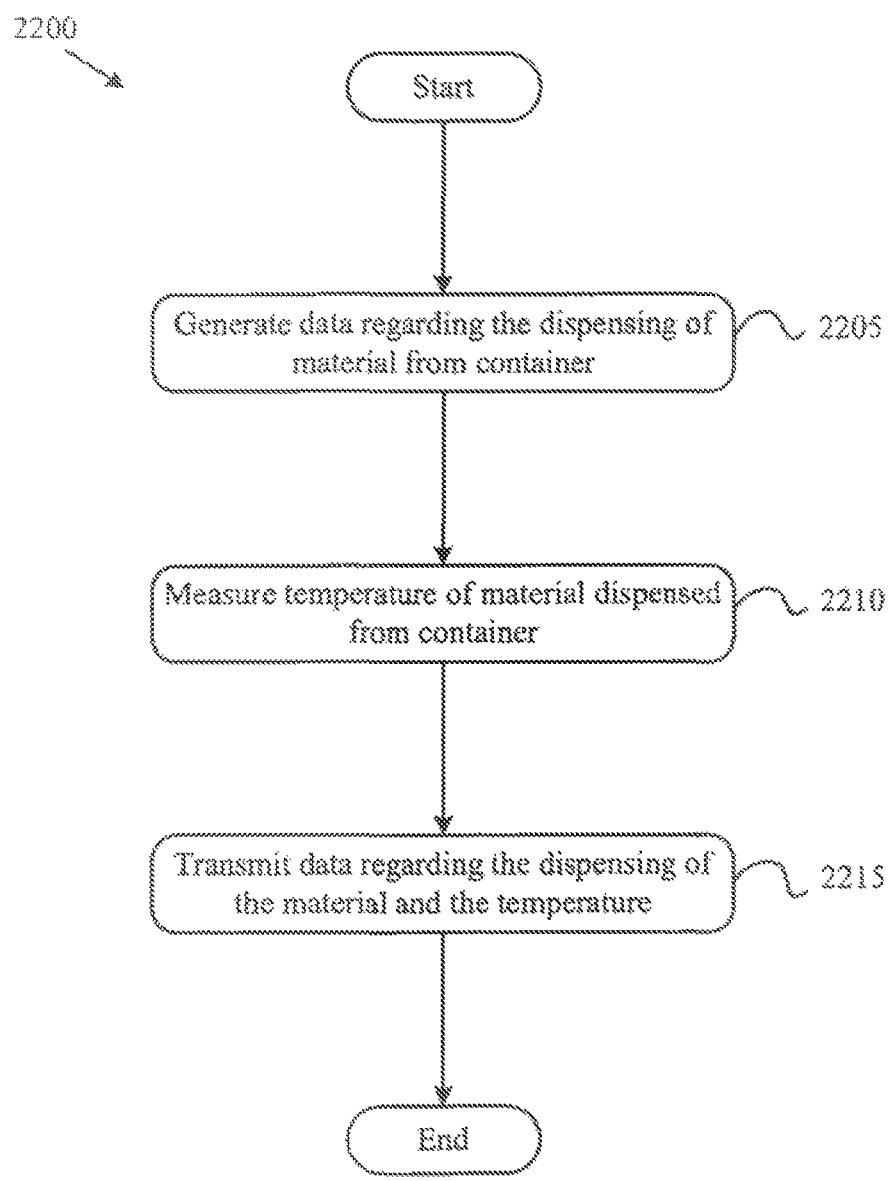

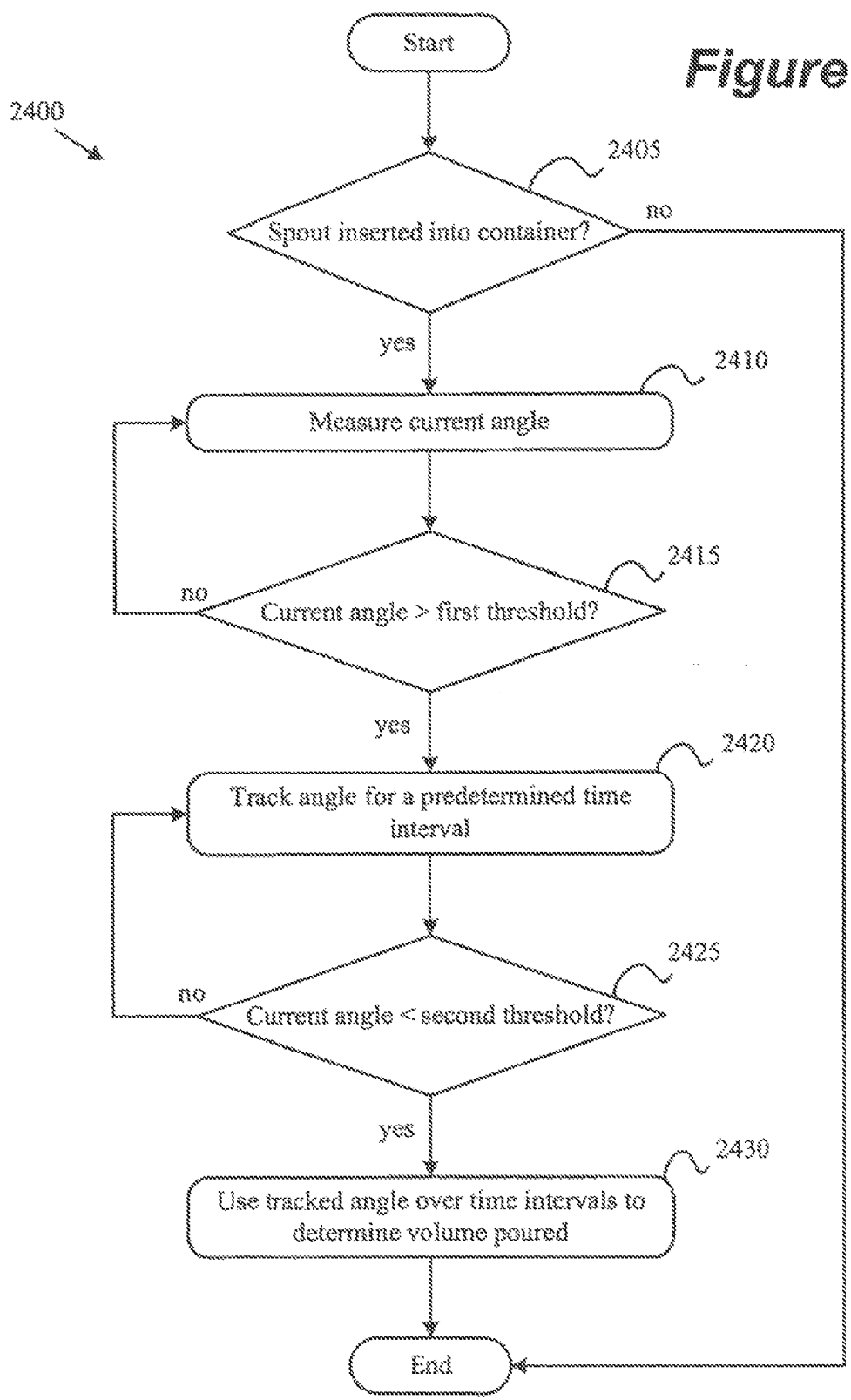

Battery Stacked Over Electronics Board via Bracket (top down)

Battery Stacked Over Electronics Board via Bracket (side view)

METHODS, APPARATUSES, AND SYSTEMS FOR MEASURING THE AMOUNT OF MATERIAL DISPENSED FROM A CONTAINER USING AN ACCELEROMETER

CLAIM OF BENEFIT TO PRIOR APPLICATION

This application is a continuation of U.S. application Ser. No. 12/688,839, filed Jan. 15, 2010, which is a continuation of U.S. application Ser. No. 12/383,462, filed Mar. 23, 2009, which claims the benefit of priority to U.S. Application Ser. No. 61/038,767, filed Mar. 23, 2008, and to U.S. Application Ser. No. 61/038,765, filed Mar. 23, 2008. U.S. application Ser. No. 12/688,839 also claims the benefit of priority to U.S. Application Ser. No. 61/274,110, filed Mar. 23, 2009. All of these applications are incorporated here by reference in their entirety.

FIELD OF THE INVENTION

The invention relates to methods, apparatuses and systems for monitoring the amount of liquid, gels, powders, and solids dispensed from containers.

BACKGROUND OF THE INVENTION

Liquids, gels, powders and solids are dispensed from containers in various industries for retail, commercial and industrial use. The measurement and centralized tracking of the amounts of materials dispensed is important to a business to control costs, ensure quality control, monitor employee performance, manage inventories, and ensure revenue.

Examples of materials that need to be measured and tracked include liquor, wine, beer, coffee, juices and pre-mixed drinks in the hospitality industry, oil, fluids, materials used in industrial and machine environments, and liquids required in the creation of solutions in the medical and veterinary environments.

In some of the commercial uses of liquids, gels, powders, and solids, dispensing devices use various methods to control or portion the quantities of materials dispensed. In some cases, the amount of materials to be dispensed is not predetermined and is variable based on the arbitrary actions of a human operator or randomly or variably dispensed by a machine.

Therefore, a need exists for better methods and processes for monitoring, measuring, and tracking the dispensing of random and/or variable quantities of a liquid, gel, powder, or solid, and storing that information for various business purposes.

SUMMARY OF THE INVENTION

Many of the methods and apparatuses of various embodiments disclosed herein relate to the tracking of inventory and the tracking of dispensed material. Some embodiments use monitoring devices of various kinds to measure the number of containers used or the amount of material dispensed from each container. The monitoring devices of such embodiments transmit their data to a central tracking system.

Some embodiments track the amount of dispensed material by the use of electronic spouts inserted into the containers that contain the materials (e.g., a bottle that contains alcohol). Different embodiments track various actions by user of the devices. For example, some embodiments track whether a spout has been inserted into a container and/or whether the spout has been removed from the container. Some such embodiments include channels that allow fluid to leak if the spout is placed in the container in a way that does not activate the tracking circuitry.

Some embodiments track the amount of a material that has been dispensed by measuring the angle at which the container is tilted (e.g., with an accelerometer on the spout or on the container). Given the angle at which material is dispensed and various other characteristics (e.g., viscosity of a liquid being poured), the methods of these embodiments are able to calculate how much of the material has been dispensed. Still other embodiments use a sonar system with an audio amplifier and a microphone to determine how much material is left in a container before and after material is poured out.

Some embodiments provide power saving by deactivating or reducing the activity of monitoring devices when material is not pouring. For example, some embodiments include a tilt switch to determine when a container is in a position to pour out material. Some embodiments provide similar power saving by using a vibration sensor to determine when material is actually pouring out of a container based on the vibrations that such pouring creates in the container.

Some embodiments include reprogrammable devices that are primed to accept new programming when the devices are shaken. In some such embodiments, the devices receive programming through infrared communications. In other embodiments, the devices receive programming through wireless communications. The following paragraphs describe some more specific aspects of various embodiments.

Some embodiments provide a spout that detects whether it has been inserted into an open orifice of a container. The spouts of some embodiments include a first component for inserting into a container, a second component for inserting into the first component, a magnetic force sensor attached to one of the components, and a magnet attached to the component to which the magnetic force sensor is not attached. In some embodiments, the insertion of the second component into the first component causes the magnet to affect the magnetic force sensor, thereby indicating that the spout is inserted into the container to seal the container. Other embodiments include a similar system in which the magnetic sensor and the magnet are internal parts of a spout that do net slide relative to one another. In some such embodiments, the magnetic sensor is activated when the pressure of the insertion on a pressure deformable part of the spout pushes the magnet close to the magnetic sensor (or pushes the magnetic sensor close to the magnet). Still other embodiments provide a pressure activation contact switch in which pressure on pressure deformable part of the spout due to an insertion causes an electrical contact to be made in the spout that indicates the insertion.

Some embodiments provide a method for detecting when a spout is inserted into an open orifice of a container. The method detects that a magnetic sensor attached to a first component of the spout is affected by a magnet attached to a second component of the spout. One of the components is for inserting into the container and the other component is for inserting into the component that is for inserting into the container. A predetermined time after the detection, the method determines whether the magnetic sensor remains affected by the magnet. When the magnetic sensor remains affected by the magnet, the method determines that the spout is inserted into the open orifice of the container. Other embodiments provide similar methods for detecting the insertion of spouts with magnetic sensors activated by pressure deformable material or pressure activation contact switches.

Some embodiments provide a system for monitoring containers at an establishment, the system includes multiple spouts. At least one of the spouts includes a first component for inserting into a container, a second component for inserting into the first component, a magnetic force sensor attached to one of the components, and a magnet attached to the component to which the magnetic force sensor is not attached. The insertion of the second component into the first component causes the magnet to affect the magnetic force sensor, thereby indicating that the spout is inserted into the container to seal the container. The system also includes a local computer at the establishment for collecting data transmitted by the spouts. The systems of some embodiments are capable of monitoring containers with spouts of any of the types mentioned above. In some embodiments, the systems are capable of tracking containers with multiple spouts, or even containers that are tracked by devices other than spouts.

Some embodiments provide a spout that attaches to a container (e.g., a bottle) in a novel manner. The spouts of these embodiments include a set of annular rings oriented parallel to a cross section of an opening of the container. The set of annular rings seals the opening of the container so that the spout becomes the only egress for the contents of the container. The spouts of these embodiments also include a set of ridges separate from the annular rings. The ridges are oriented perpendicular to the cross section of the opening. The set of ridges hold the spout in the container by frictional forces.

Some embodiments provide a device that determines how much material is dispensed from a container by measuring the angle at which the container is tilted. In some embodiments, such devices include an accelerometer for measuring an angle by which the container is tilted and en electronic component for transmitting data based on the angle measured by the accelerometer. In some embodiments, the accelerometer measures the angle by which the container is tilted at a multiple different times.

Some embodiments provide a method for measuring the amount of material dispensed from a container. The method measures an angle by which the container is tilted (e.g., using an accelerometer that is part of a device attached to the container. The method generates data based on the angle measurement and transmits the generated data to some external system.

In some embodiments, the external system receives data transmitted from such a device attached to a container. In some embodiments, the data includes an estimate of the amount of material dispensed from the container that is generated based on measurements of angles by which the container is tilted. In some embodiments, the data received by the external system is generated by the device based on an assumption that the material is a known, baseline material. The method of some embodiments identifies the material dispensed from the container based on an identifier in the received data. The method calculates the actual amount of material dispensed by using an offset that accounts for a difference in viscosity between the known, baseline material and the identified material.

Some embodiments include devices with features that are only needed when the container is tilted. The devices of some such embodiments include a monitoring device for measuring data that is used to calculate the amount of material dispensed from the container. The monitoring device takes measurements at variable time intervals. The devices also include a tilt switch connected to the monitoring device that detects when the container is tilted by at least a particular tilting angle. This the device can vary the time intervals at which measurements are taken (e.g., by the monitoring device) based on whether the container is tilted by at least the particular tilting angle. In some embodiments, decreasing the rate of monitoring when the tilt switch is not activated saves power.

Some embodiments include a temperature sensor to help determine the volume of material dispensed. For example, the density or viscosity of a material may be affected by temperature, which would affect the calculations of the pour rate.

Some embodiments provide devices with an accelerometer that detects frictional vibrations created when material is dispensed from the container. Such accelerometers can be used in a similar manner to the tilt switch described above. When the accelerometer detects frictional vibrations from material being dispensed, the device increases the frequency at which it monitors instruments that directly or indirectly measure the flow of material from a container. Some embodiments include devices, such as spouts for containers that are reprogrammable (e.g., for updating data and firmware updates). The spout of some embodiments includes a processor for controlling various electronic components of the spout according to a set of instructions, an electronic storage device for storing the set of instructions for the processor, and a sensor for receiving instructions via wireless transmission from an external source. The received instructions are used to modify the set of instructions stored on the electronic storage device of the spout. Some embodiments use an infrared sensor or a magnetic sensor. Some embodiments prepare to receive reprogramming when a vibration detecting sensor determines that the spout is being shaken. Other embodiments provide a spout with two-way communication to an external system that is able to signal the spout to accept reprogramming.

BRIEF DESCRIPTION OF THE DRAWINGS

FIG. 5 illustrates some embodiments including a sliding cork stem that uses a magnet and a magnetic sensor to determine when the sliding cork stem is inserted or removed from a container.

FIG. 7 illustrates a special cork used in some embodiments that includes pressure deforming material that expands with compression force on a fin or fins.

FIG. 9 conceptually illustrates a process used in some embodiments that uses a magnet adjacent to pressure deforming material and a magnetic sensor to determine if a pouring device is inserted in a container.

FIGS. 14A-14B illustrate some embodiments that provide an accelerometer on an electronic circuit board housed in a pouring device.

FIG. 15 illustrates some embodiments that provide an accelerometer attached to the outside or inside of a container.

FIG. 22 conceptually illustrates a process of some embodiments for measuring the temperature of material being dispensed from a container and transmitting this information with other pour data.

FIG. 24 conceptually illustrates a process of some embodiments of invention for calculating the volume of material dispensed from a container by measuring the angle of inclination and duration of time material is being dispensed.

DETAILED DESCRIPTION OF THE INVENTION

In the following description, numerous details are set forth for purpose of explanation. However, one of ordinary skill in the art will realize that the invention may be practiced without the use of every specific detail. In other instances, well-known structures and devices are shown in block diagram form in order not to obscure the description of the invention with unnecessary detail.

Figure 1:
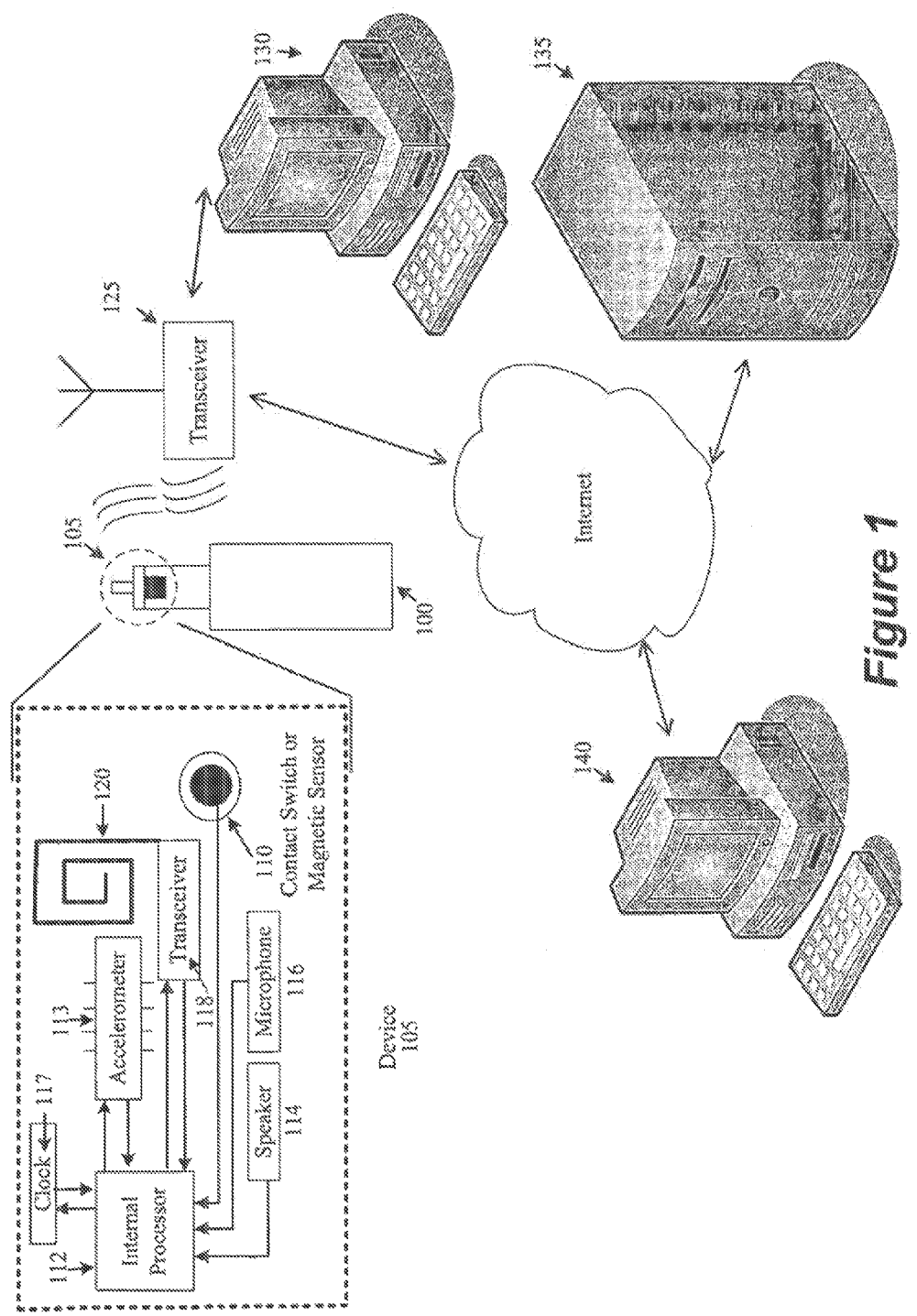
FIG. 1 conceptually illustrates an overview of some embodiments.

The invention is directed towards methods, apparatuses, and systems for monitoring the amount of a material (e.g., liquid, gels, powders, and solids) dispensed from a container. In some embodiments, the material is an alcoholic beverage. FIG. 1 shows an overview of some embodiments. Individual devices 105 (sometimes referred to herein as "pouring devices", "dispensing orifices", or "spouts") are placed on containers 100 that dispense materials (e.g., liquids, gels, powders, or solids). For simplicity, only one device and one container are shown in FIG. 1.

The devices 105 measure the distribution of the materials from the containers 100 in real-time through various methods. In some embodiments, the devices 105 can include an accelerometer 113 to measure angle of inclination of containers 100 as they pour/dispense material. In other embodiments, the devices 105 can include a speaker 114 and microphone 116 in which a pulse of sound is emitted from the speaker 114 and heard by the microphone 116 in which the delay in time determines the amount of material in the container 100. In some embodiments, the electronics contained in the device will also include a physical contact switch or magnetic sensor (sometimes referred to as a magnetic switch) 110, an internal processor 112, a clock 117, a transceiver 118 and an optimized antenna 120.

The information related to the distribution of the material from the monitoring device is communicated to a central computer either by wireless communication or via a directly wired connection. In some embodiments, the device information is stored within internal device memory (not shown—in some embodiments, memory is part of the internal processor; other embodiments include internal memory outside the internal processor) until it is distributed to the central computer. In other embodiments, the device information is transmitted in real-time from the transceiver 118 through a radio frequency communication to a transceiver 125 connected to a network, the Internet, or directly to a computer 130.

In some embodiments, the information sent from the transceiver 118 is raw data from the device 105. In some such embodiments, the internal processor of the device does not perform any of the calculations that determine how much material has been dispensed from the container. In other embodiments, the internal processor 112 performs calculations on the raw data from the device 105 before sending the information. For instance, in some embodiments the internal processor performs some or all of the calculations that determine how much material (e.g., liquid, gel, powder, or solid) has been dispensed from a container based on the raw data. Ultimately, the information is received, processed, and stored on software that runs on a computer 140, server 135, etc. and includes information for one, device or many devices in a distributed environment.

Some embodiments receive, process, and store information from devices 105 that are at multiple establishments. Generically, an establishment is any location in which materials (e.g., liquids, powders, gels, or solids) are dispensed. In some embodiments, the multiple establishments are multiple bars, restaurants, or other establishments that serve alcoholic beverages. In the case of embodiments that partially perform calculations on the device 105, any further processing is done by the software on computer 140, server 135, etc. Some embodiments provide two-way communication between the device and the servers 135 or computer 140. In these embodiments, the devices 105 not only send information to the software through a network, a network of networks (such as the Internet) or directly to a computer 130, but the software is also able to communicate information, nine/date coordination, commands, instructions, calibrations or firmware upgrades to the devices 105 through the transceiver 118. The software of some embodiments provides the individual and aggregated device information, calculations and extrapolations on a computer 130 or 140, server 135, or other computing device.

Various embodiments include a variety of different features. Some of the embodiments of removable pouring devices monitor whether the device is placed on a pouring orifice of a container containing liquids, gels, powders, or solids. Some embodiments of removable pouring devices monitor whether the device is removed from a pouring orifice of a container containing liquids, gels, powders, or solids. In some embodiments, the devices monitor both whether the devices have been placed on a container and whether the devices have been removed from the container. Some embodiments of the devices measure the amount of time for which liquids, gels, powders, or solids are poured through a dispensing orifice. Some embodiments measure the angle of inclination of a container from which liquids, gels, powders, or solids are poured through a dispensing orifice. Some embodiments measure the temperature of materials within a container from which liquids, gels, powders, or solids are poured through a dispensing orifice. Some embodiments measure the displacement rate and volumes of air which pass into the container from which liquids, gels, powders, or solids are poured through the dispensing orifice. Some embodiments measure the actual volumes of material in a container, over a rapid sequence of time intervals, from which liquids, gels, powders, or solids are poured through the dispensing orifice. Some embodiments measure the pressure/force of liquids, gels, powders, or solids as they exit out of a container through a dispensing orifice. A person having ordinary skill in the art will realize that some embodiments will include only one of the above described features, while other embodiments will include more than one of the above described features.

I. Sliding Cork Stem

The spouts of some embodiments include a bottom portion that is inserted into the opening of a container (e.g., a liquor bottle). In some embodiments, the bottom portion of the spout includes a "cork" that flexes to snuggly attach the spout to the container. The term "cork" as used herein refers to a portion of the spout that grips the container and provides a seal that prevents any material from flowing around the spout rather than through the spout. The term "cork" is used generically to identify the function of the cork, not to limit it to the tree based material called "cork". Instead, the cork could be made of any material servicing these functions. Some embodiments provide removable corks in different sizes in order to fit different types of containers. The spouts described herein include a fluid-flow passageway to allow the liquids or other materials to flow/pass through the spout. In some embodiments, the fluid flow passageway is designed to ensure laminar (smooth and unturbulent) flow of a liquid when a liquid container and hence the spout are inclined at a certain angle (e.g., 20 degrees) past the horizontal axis of the liquid container. For example, in some embodiments, the ratio of the passageway's length to its width (or diameter) is equal to or less than 20 in order to ensure laminar fluid flow. When properly placed, the spouts of some embodiments seal the containers, meaning that the fluid flow passageway of the spout becomes the only way for material to exit the container while the spout is in place. Various spouts are described in more detail below.

Figure 2:
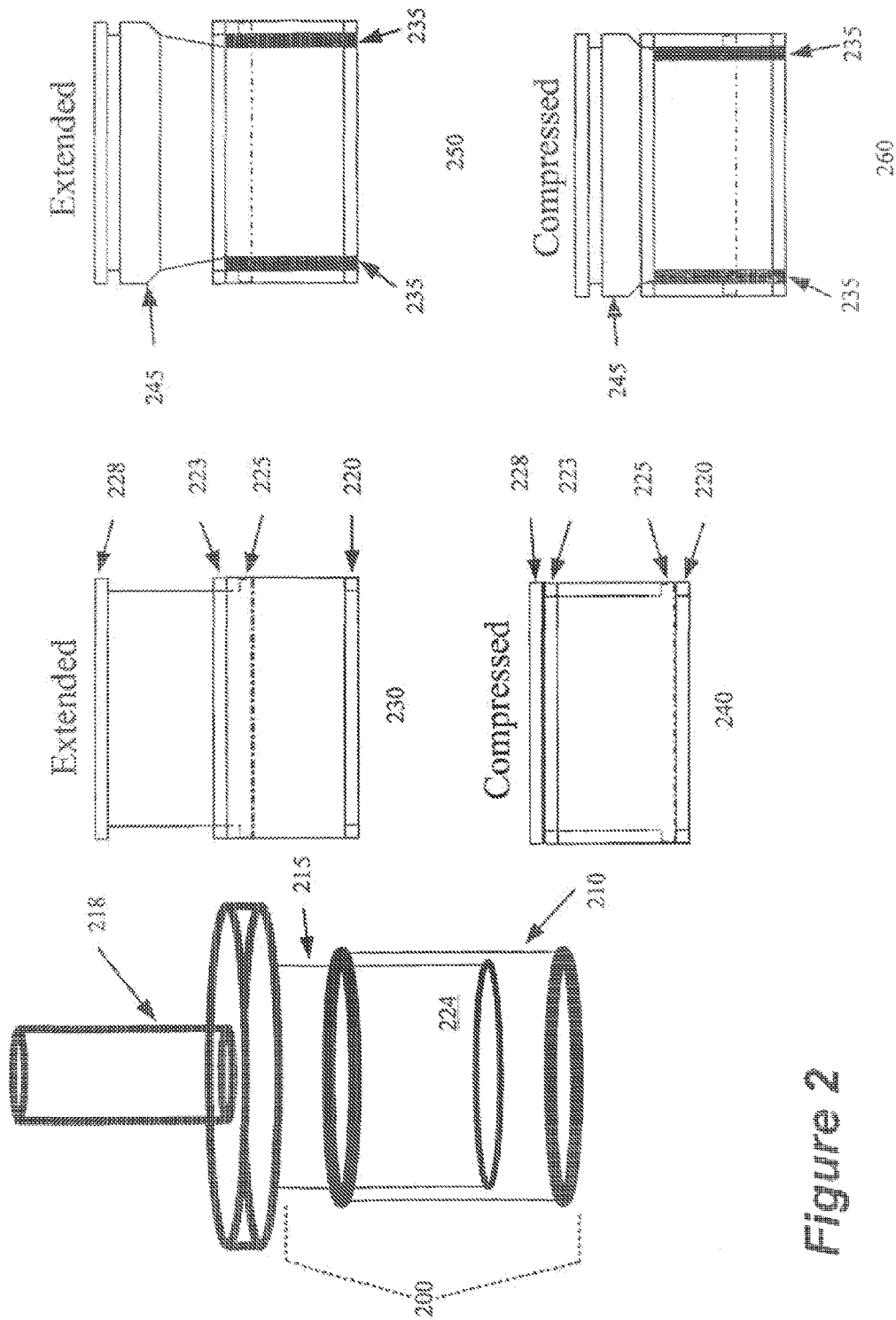
FIG. 2 illustrates the functionality of a sliding cork stem used in some embodiments.

FIG. 2 illustrates a sliding stem 200 (also referred to as a sliding cork stem), that is part of a spout that is inserted into a container used in some embodiments. As shown, the sliding stem 200 includes a sliding component 215 (also referred to as an "interior housing unit") connect to the top of the spout 218 and a stationary component 210 (also referred to as an "exterior housing unit"). The stationary component 210 is stationary relative to the top of the container in which it is inserted (not shown), while the sliding component 215 slides relative to the top of the container in which it is inserted (not shown). The sliding component 215 includes a top lip 228, a bottom lip 225, and a hollow center 224 that allows liquid or other materials to pass through the sliding stem 200. The stationary component 210 also includes a top lip 223 and a bottom lip 220, both of which are hollow in the center to allow liquids or other materials to pass through the sliding stem 200. When the sliding stem 200 is in an extended state, in section 230, the top lip 223 of the stationary component 210 is in contact with the bottom lip 225 of the sliding component 215, providing an extension limit for the sliding stem 200. When the sliding stem 200 is in a compressed state, in section 240, the bottom lip 220 of the stationary component 210 is in contact with the bottom lip 225 of the sliding component 215 and the top lip 223 of the stationary component 210 is in contact with the top lip 228 of the sliding component 215, providing physical contact between the stationary component 210 and sliding component 215 of the sliding stem 200.

Sliding stem 200 also includes a fin 245 made of malleable material and fluid flow channels 235 in some embodiments. As shown, in section 250, when the sliding stem 200 is in an extended state, material is able to flow freely through the fluid flow channels 235. In some embodiments, the fluid flow channels 235 are narrow tube, in other embodiments they extend around the stem. In the extended state of the sliding stem 200, material would leak profusely from the container through the fluid flow channels 235 when a pour was attempted. As shown, in section 260, when the sliding stem 200 is in a compressed state, the compression forces the fin 245 to block the fluid flow channels 235. Because the sliding stem 200 leaks when extended, the user of the device is forced to make sure that the sliding stem 200 is fully compressed. This is useful because the magnetic sensor of some embodiments is activated when the sliding stem 200 is in a compressed state, as further described below. In the compressed state of the sliding stem 200, frictional force holds the fin 245 in place and prevents the sliding component 215 and the stationary component 210 from separating.

A. Sliding Activation of Magnetic Sensor

Figures 3A, 3B:
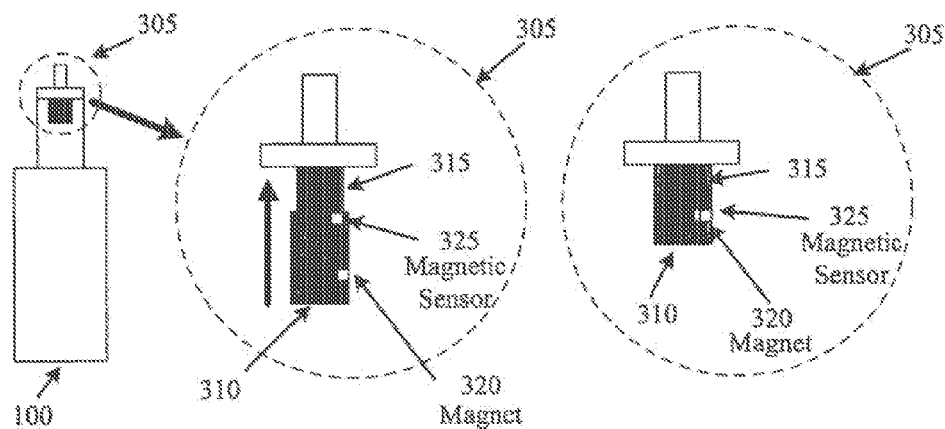
FIGS. 3A-3B illustrate some embodiments that use a magnet and magnetic sensor to determine when a pouring device is inserted or removed from a container.

FIGS. 3A-3B illustrate a spout 305 that is inserted into a container 100 in some embodiments. As shown, the spout 305 includes a sliding stem that has a sliding component 315 and a stationary component 310. The spout 305 also includes a magnet 320 and a magnetic sensor 325. In the embodiments illustrated in FIG. 3A-3B, the action of connecting the spout 305 to the container 100 is detected through the sliding cork stem. In some embodiments, the sliding component 315 of the stem includes the magnetic sensor 325 and a circuit board (not shown) and the stationary component 310 of the stem includes the magnet 320. In other embodiments, the sliding component 315 of the stem includes the magnet 320 and the stationary component 310 of the stem includes the magnetic sensor 325 and a circuit board (not shown). In its non-inserted state (e.g., before the sliding stem is compressed during insertion of the spout into the container), illustrated in FIG. 3A, the magnet 320 has no effect on the magnetic sensor 325. When the sliding stem is placed within a container 100 (inserted state), as illustrated in FIG. 3B, the force of the insertion pushes the stationary component 310 along the sliding component 315 of the stem so that the magnet 320 affects the magnetic sensor 325. In some embodiments, the state of the magnetic sensor 325 (inserted or non-inserted) is captured through a circuit board (not shown) and used to activate various functions within the firmware within the circuit board.

FIG. 5 illustrates a sliding cork stem 500 that detects when it is inserted into a container in some embodiments. As shown, the sliding cork stem 500 includes a dispensing channel 540, a magnetic sensor 525 attached to a circuit hoard 535, and a magnet 520 that gives off a magnetic effect 550. When the sliding cork stem 500 is in an extended state, i.e., not inserted in a container, in section 505, the magnetic sensor 525 is not activated by the magnetic effect 550 from the magnet 520. When the sliding cork stem 500 is in a compressed state, i.e., inserted in a container, in section 510, the magnetic sensor 525 is activated by the magnetic effect 550 from the magnet 520. The state of the magnetic sensor 525 (inserted or non-inserted) is captured through the circuit board 535 and used to activate various functions within the firmware within the circuit board 535. In some embodiments, the positions of the magnet 520 and the magnetic sensor 525 attached to the circuit board 535 are switched.

B. Multiple Fins with Distinct Functions

Figure 4A:
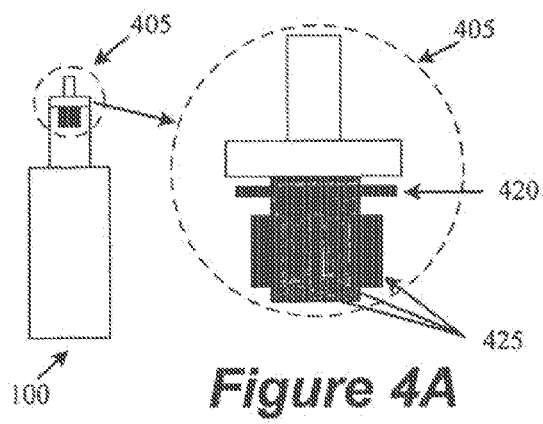
FIGS. 4A-4C illustrate some embodiments that use a cork designed to distinctly differentiate the functional purposes of frictional hold and liquid sealing.
Figures 4B, 4C:
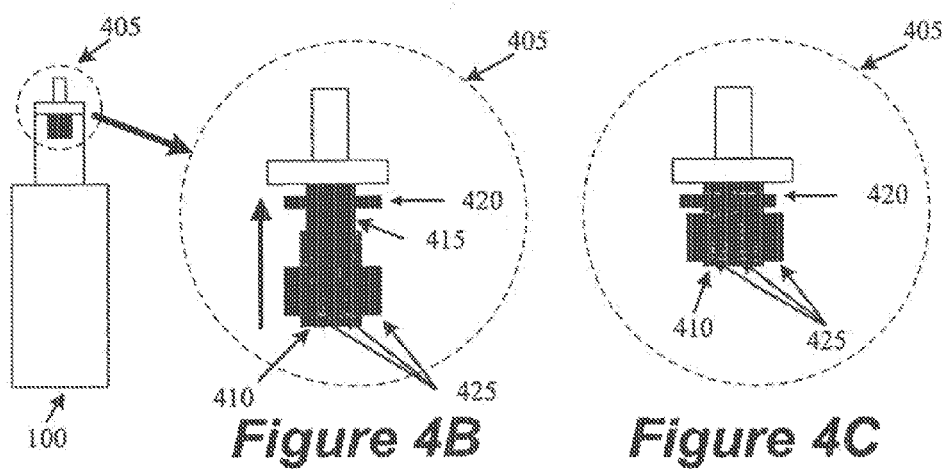

FIGS. 4A-4C illustrate a cork designed to distinctly differentiate the functional purposes of frictional hold and liquid sealing capabilities in some embodiments. Typical cork designs use fins oriented to the cross-sectional plane of a liquid container opening. Such fins function with two primary purposes—to provide frictional hold and to provide a liquid seal. In some embodiments, various cork fins are used for distinct functional purposes. As shown in FIG. 4A, one individual liquid sealing fin 420 or a set of multiple liquid sealing fins 420 are placed across (i.e., parallel to) the cross-section of the container opening and provide only liquid seal capabilities. A second individual or set of multiple fins, in this case frictional hold cork fins 425, are placed at right angles (i.e., perpendicular to) the cross-section of the container opening and provide frictional hold capabilities.

When used in conjunction with the sliding cork stem described above, the spout 305 will not create a liquid seal when the spout 305 is not fully placed on a container 100, as shown in FIG. 4B. This will cause liquid to leak profusely from the container 100. When the spout 305 is fully placed on a container 100, as shown in FIG. 4C, the stationary component 410 creates a liquid seal with the sealing fin 420, preventing liquid from leaking from the container 100. In some embodiments, the container 100 is sealed by the sealing fin 420 when the sealing fin 420 is flush with the opening. In other embodiments, the container 100 is sealed by the sealing fin 420 when the sealing fin 420 is partially or fully inserted into the container opening.

C. Combination of Magnetic Sensor and Multiple Fins with Distinct Functions

In some embodiments, the spout 305 shown in FIGS. 3A-3B also includes an individual (or set of multiple) liquid sealing fins and an individual (or set of multiple) frictional hold cork fins. As shown in FIGS. 4A-4C, the set of frictional hold cork fins 425 are utilized to provide force to mechanically slide the sliding component 415 of the sliding cork stem. As shown in FIG. 4C, when the sliding component 415 is forced to its full position of connection, the liquid sealing cork fin or fins 420 are positioned to prevent liquid from seeping/spilling from between the cork stem and the container opening. The seal occurs at the same distance of compression at which the magnet 320 affects the magnetic sensor 325.

In some embodiments, the action of the sliding portion 415 of the cork stem is engineered to scrape/remove debris and detritus from the surfaces of the sliding and stationary parts of the cork stem and, therefore, providing a self cleaning function.

D. Process of Verifying Insertion

Figure 6:
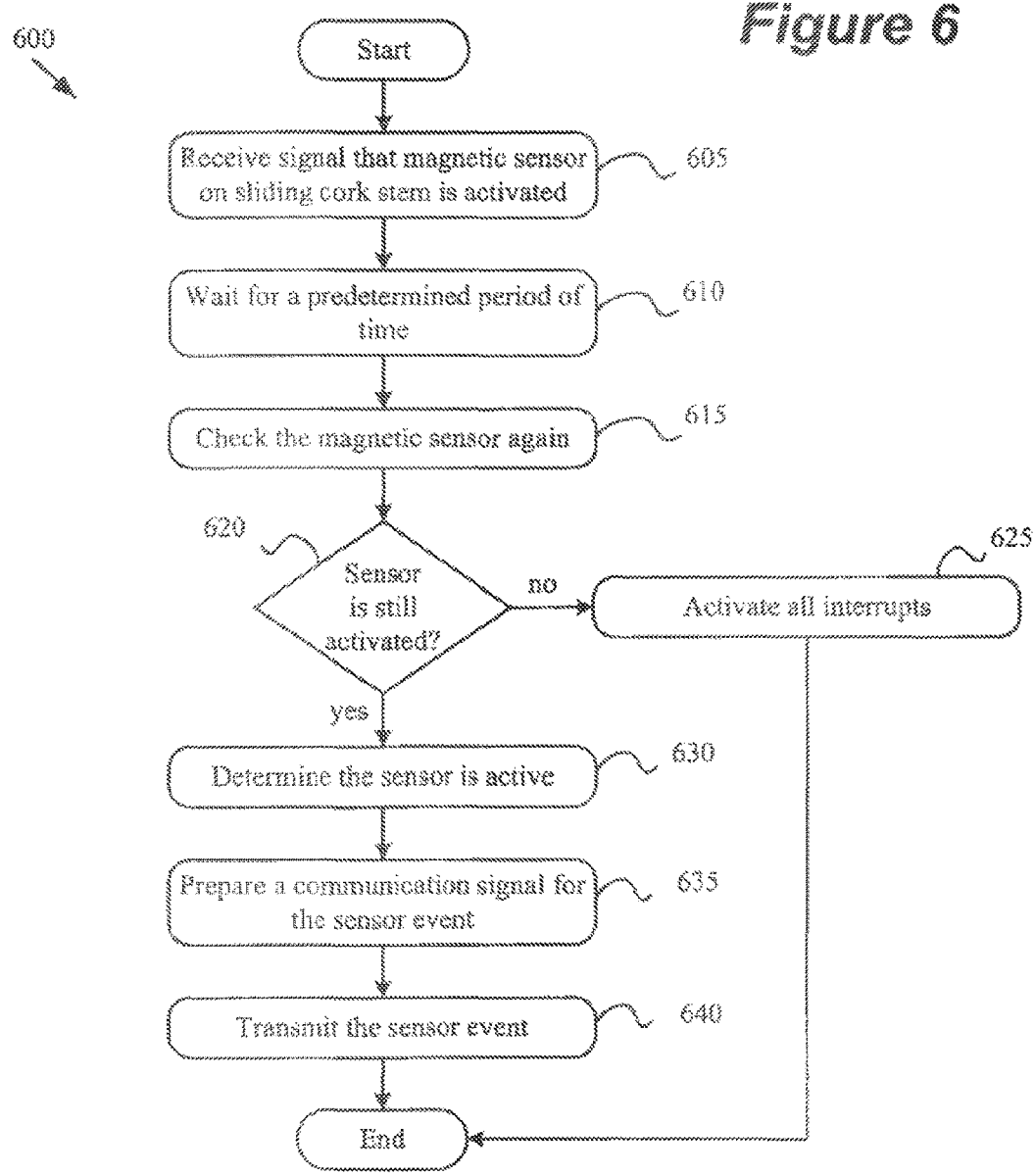
FIG. 6 conceptually illustrates a process used in some embodiments that uses a magnet and a magnetic sensor on a sliding cork stem to determine when a pouring device is inserted in a container.

FIG. 6 conceptually illustrates a process 600 of some embodiments by which a spout with a magnetic sensor that is activated by a sliding cork stem that brings the sensor in range of a magnet determines that it has been inserted into a container and signals that it has been inserted into a container. The process receives (at 605) a signal from a magnetic sensor indicating that the sensor has been triggered. In some embodiments, the sensor is triggered by a sliding cork stem bringing the sensor into range of a magnet as described in relation to FIG. 5. Once the sensor has been triggered, the process waits (at 610) for a predetermined period of time. After the predetermined period has expired, the process checks (at 615) the sensor again. Next, the process determines (at 620) whether the sensor is still being triggered. Some embodiments provide continuous check over the predetermined time.

When the sensor is no longer being triggered the process resets (at 625) the spout (e.g., activates all hardware interrupts) to await the next triggering of the sensor and the process ends. Otherwise, when the sensor is still being triggered the process recognizes (at 630) that the sensor is still being triggered. The process then prepares (at 635) a communication signal for the contact event, e.g., to notify a system such as an inventory management computer that the spout has been inserted into a container. In some embodiments, the prepared communication signal includes a serial number or other identifier of the spout. The process then sends (at 640) the communication signal identifying the contact event, e.g., to an inventory system.

II. Pressure Activation of a Magnetic Sensor in a Spout

FIG. 7 illustrates a cork 700 that includes a section of pressure deforming material 710 that is used in some embodiments. As shown, the cork 700 includes fins 720-730 and sections of pressure deforming material 710 bulged inside the cork 700. As shown, compression force is placed on the exterior of the cork 700, causing the section of pressure deforming material 710 to bulge inside the cork. In some embodiments, the bulging of the section of pressure deforming material 710 activates a sensor or switch. In some embodiments, the cork will have fins 720-730 of different sizes. These fins 720-730 provide a liquid seal for different size containers. For instance, the cork can be inserted in a container with an opening too large for fins 725730, since fin 720 can be large enough to provide a liquid seal. Similarly, fin 720 may be too large to fit into a smaller container opening. In that case, the smaller fins 730 or 725 can provide a liquid seal. In some embodiments, the fin 720-730 can be around the entire circumference of the cork 700. In other embodiments, the fin 720-730 may be attached to the side of the cork 700.

Figure 8A:
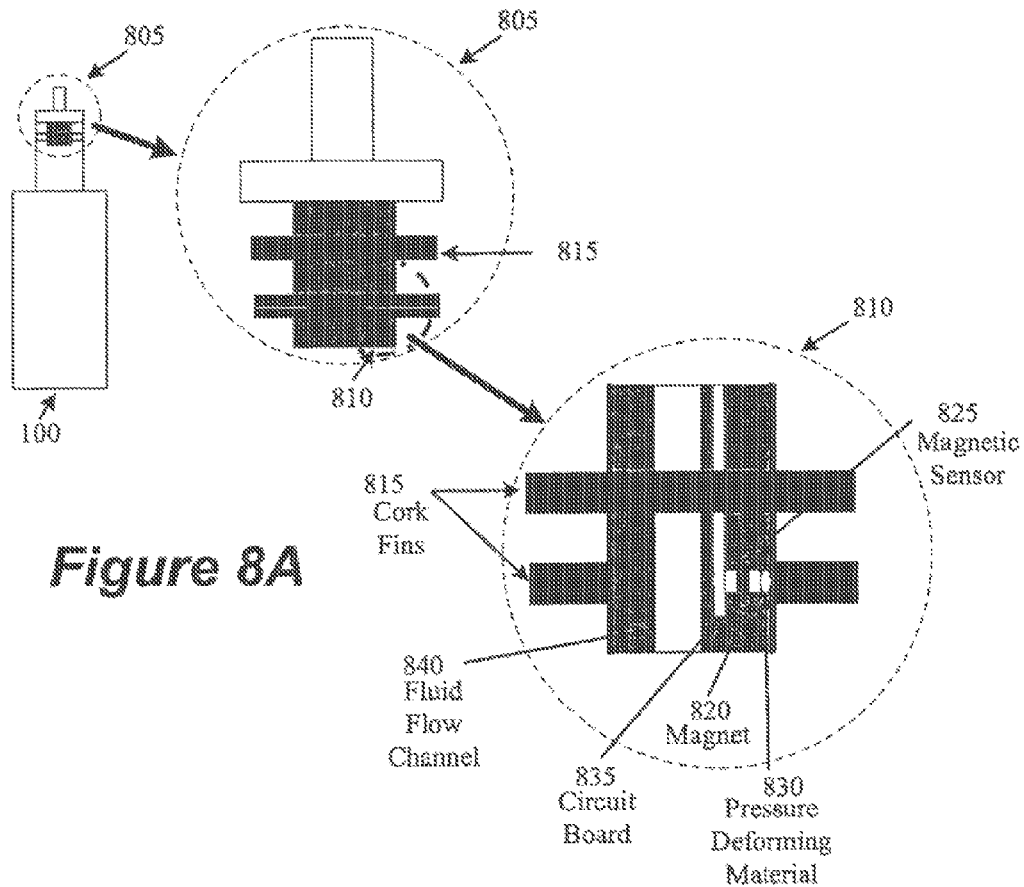
FIGS. 8A-8C illustrate some embodiments that use pressure deforming material to activate a magnetic sensor which determines when a pouring device is inserted or removed from a container.
Figure 8B:
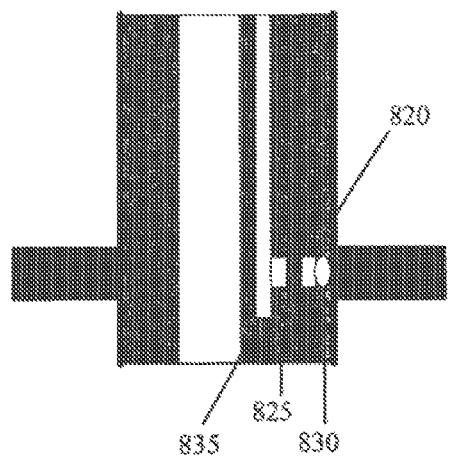
Figure 8C:
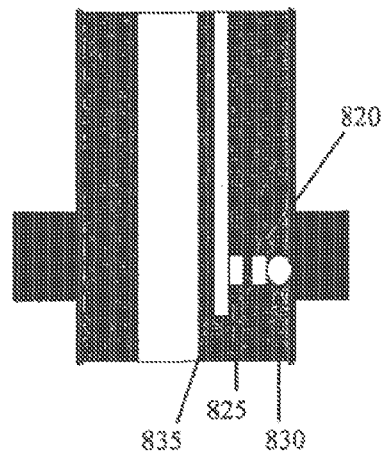

FIGS. 8A-8C illustrate a spout 805 that is inserted into a container 100 in some embodiments. As shown, the spout 805 includes a set of fins 815 including a section of pressure deforming material 830 adjacent to a magnet 820. The spout 805 also includes a fluid flow channel 840 and a magnetic sensor 825 connected to a circuit board 835. In these embodiments, the action of connecting the spout 805 to the container 100 causes the fins 815 to exert pressure and deform the pressure-deforming material 830, pushing the magnet 820 towards the magnetic sensor 825, activating the magnetic sensor 825.

FIG. 8B illustrates the spout 805 when the spout 805 is not placed on a container 100 in some embodiments. As shown in FIG. 8B, there is no pressure on the pressure deforming material 830, and therefore the magnet 820 is not close enough to the magnetic sensor 825 to activate the magnetic sensor 825. When the spout 805 is placed on the container 100, as illustrated in FIG. 8C, the pressure deforming material 830 pushes the magnet 820 towards the magnetic sensor 825. The new position of the magnet 820 activates the magnetic sensor 825 on the circuit board 835. When the magnetic sensor 825 is activated, the circuit board 835 recognizes that the spout 805 has been placed on a container 100. Similarly, the removal of the spout 805 from the container 100 causes the pressure deforming material 830 to shrink, as shown in FIG. 8. When the pressure deforming material 830 shrinks, the magnet 820 moves away from the magnetic sensor 825, which deactivates the magnetic sensor 825. The circuit board 835 then recognizes that the spout 805 is no longer placed on the container 100.

FIG. 9 conceptually illustrates a process 900 of some embodiments by which a spout with a magnetic sensor that is activated by pressure on the spout determines that it has been inserted into a container and signals that it has been inserted into a container. The process receives (at 905) a signal from a magnetic sensor indicating that the sensor has been triggered. In some embodiments, the sensor is triggered by pressure deforming material as described in relation to FIGS. 8A-8C. Once the sensor has been triggered, the process waits (at 910) for a predetermined period of time. After the predetermined period has expired, the process checks (at 915) the sensor again. Next, the process determines (at 920) whether the sensor is still being triggered.

When the sensor is no longer being triggered, the process resets (at 925) the spout (e.g., activates all hardware interrupts) to await the next triggering of the sensor and the process ends. Otherwise, when the sensor is still being triggered, the process recognizes (at 930) that the sensor is still being triggered. The process then prepares (at 935) a communication signal for the contact event, e.g., to notify a system such as an inventory management computer that the spout has been inserted into a container. In some embodiments, the prepared communication signal includes a serial number or other identifier of the spout. The process then sends (at 940) the communication signal identifying the contact event, e.g., to an inventory system.

Figure 10:
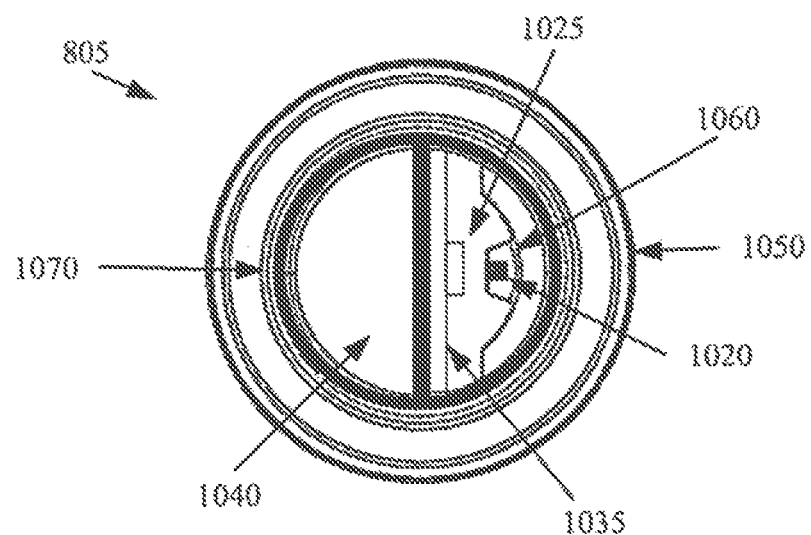
FIG. 10 illustrates a top down sectional view of some embodiments that use pressure deforming material to activate a magnetic sensor which determines when a pouring device is inserted or removed from a container.

FIG. 10 illustrates a top down sectional view of a spout 805 that detects when it is inserted into a container in some embodiments. As shown, the spout 805 includes a flexible cork 1050 and a dispensing channel 1040. The spout 805 also includes, enclosed in a hard casing 1070, a magnet 1020 adjacent to, or within, pressure deforming material 1060 bulged through a hole in the hard casing 1070 and a magnetic sensor 1025 attached to a circuit board 1035. When spout 805 is inserted into container, pressure is placed on the flexible cork 1050. The pressure on the flexible cork 1050 causes the section of pressure deforming material 1060 to which the magnet 1020 is adjacent, or within, to push through the hole in the hard casing 1070, pushing the magnet 1020 within range of the magnetic sensor 1025, and activating the magnetic sensor 1025. Similarly, the removal of spout 805 from container removes the pressure from the flexible cork 1050 causing the section of pressure deforming material 1060 to shrink back through the hole in the hard casing 1070. When the section of pressure deforming material 1060 shrinks back, the magnet 1020 is no longer in range of the magnetic sensor 1025, and the magnetic sensor 1025 is no longer activated. In some embodiments, the state of the magnetic sensor 1025 (inserted or non-inserted) is captured through the circuit board 1035 and used to activate various functions within the firmware within the circuit board 1035.

III. Pressure Activation of a Contact Switch in a Spout

Figure 11A:
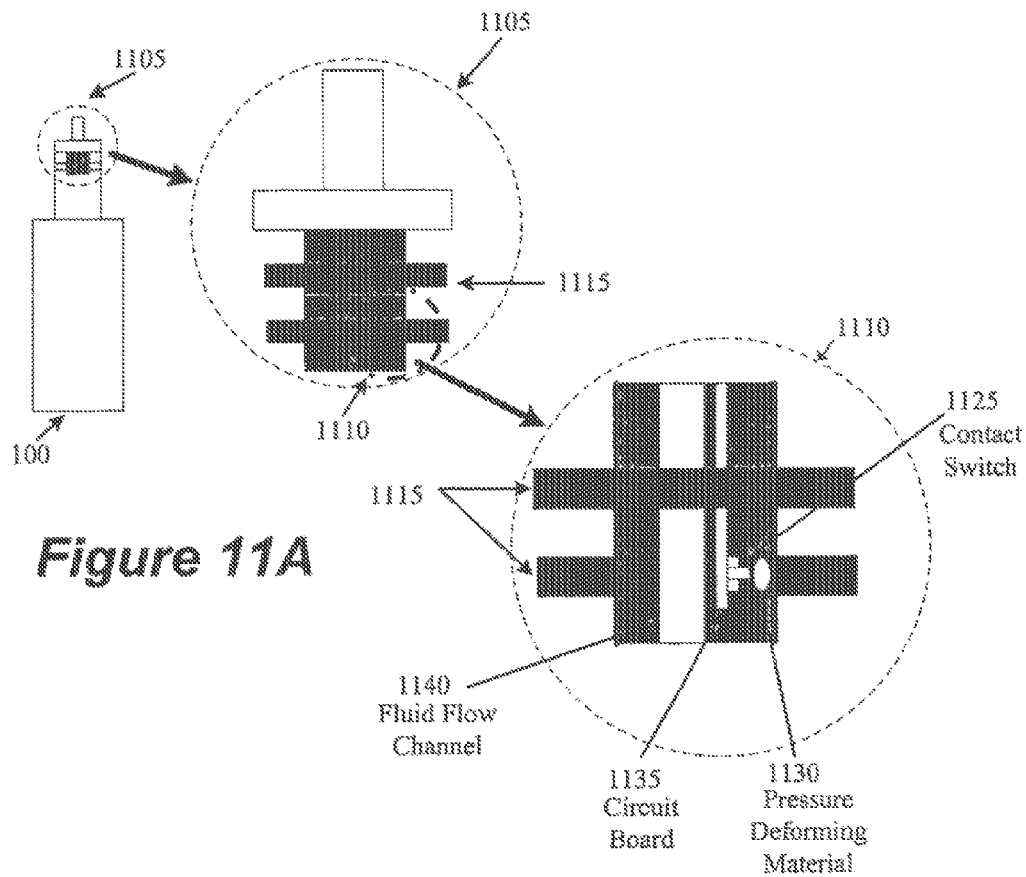
FIGS. 11A-11C illustrate some embodiments that use pressure-deforming material to activate a physical contact switch which determines when a pouring device is inserted or removed from a container.
Figure 11B:
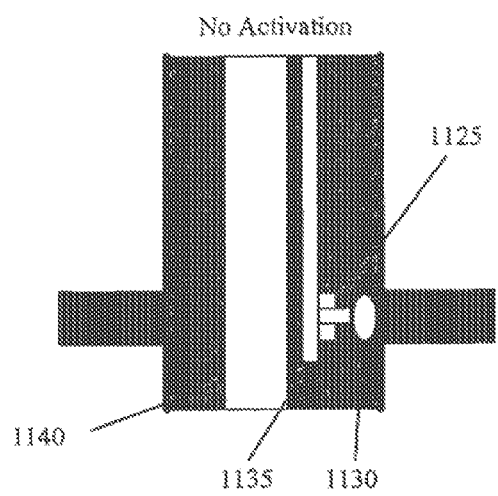
Figure 11C:
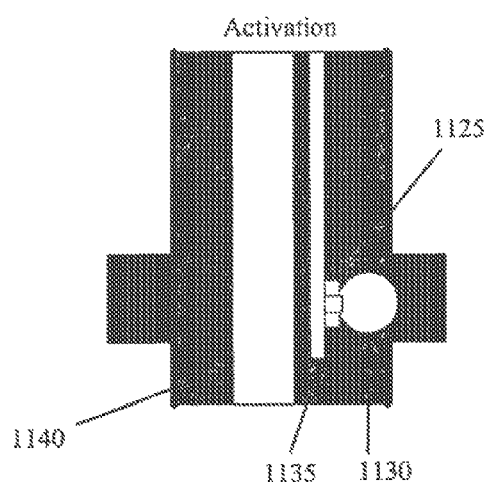

FIGS. 11A-11C illustrate a spout 1105 that is inserted into a container 100 in some embodiments. As shown, the spout 1105 includes a set of fins 1115, a contact switch 1125, a circuit board 1135, a fluid flow channel 1140, and a section of pressure deforming material 1130. As shown, the contact switch 1125 is connected to a circuit board 1135 and the section of pressure deforming material 1130 is adjacent to the contact switch 1125. In these embodiments, the action of connecting the spout 1105 to the container 100 causes the fins 1115 to exert pressure and deform the pressure-deforming material 1130, pushing the contact switch 1125. In some embodiments, the contact switch 1125, and the magnetic sensors that detect when a spout has been inserted into a container, as described in previous sections, are generically referred to as "insertion detectors".

FIG. 11B illustrates section 1110 of the spout 1105 when the spout is not inserted in a container 100. In this configuration, there is no pressure on the pressure deforming material 1130. Therefore, the pressure deforming material 1130 does not push on the contact switch 1125, which therefore is not activated. The circuit board 1135, therefore, recognizes that the spout 1105 is not on the container 100. FIG. 11C illustrates the section 1110 of the spout 1105 when the spout is placed on a container 100. As shown in FIG. 11C, pressure from the fins 1115 deforms the pressure deforming material 1130. The pressure deforming material 1130 pushes on the contact switch 1125, activating the contact switch 1125. Therefore, the circuit board 1135 recognizes that the spout 1105 is on the container 100. Similarly, the removal of the spout 1105 from the container 100 causes the pressure deforming material 1130 to shrink back, as shown in FIG. 11B. When this occurs, the contact switch 1125 is no longer activated, and the circuit board 1135 recognizes that the spout 1105 is no longer on the container 100.

Figure 12:
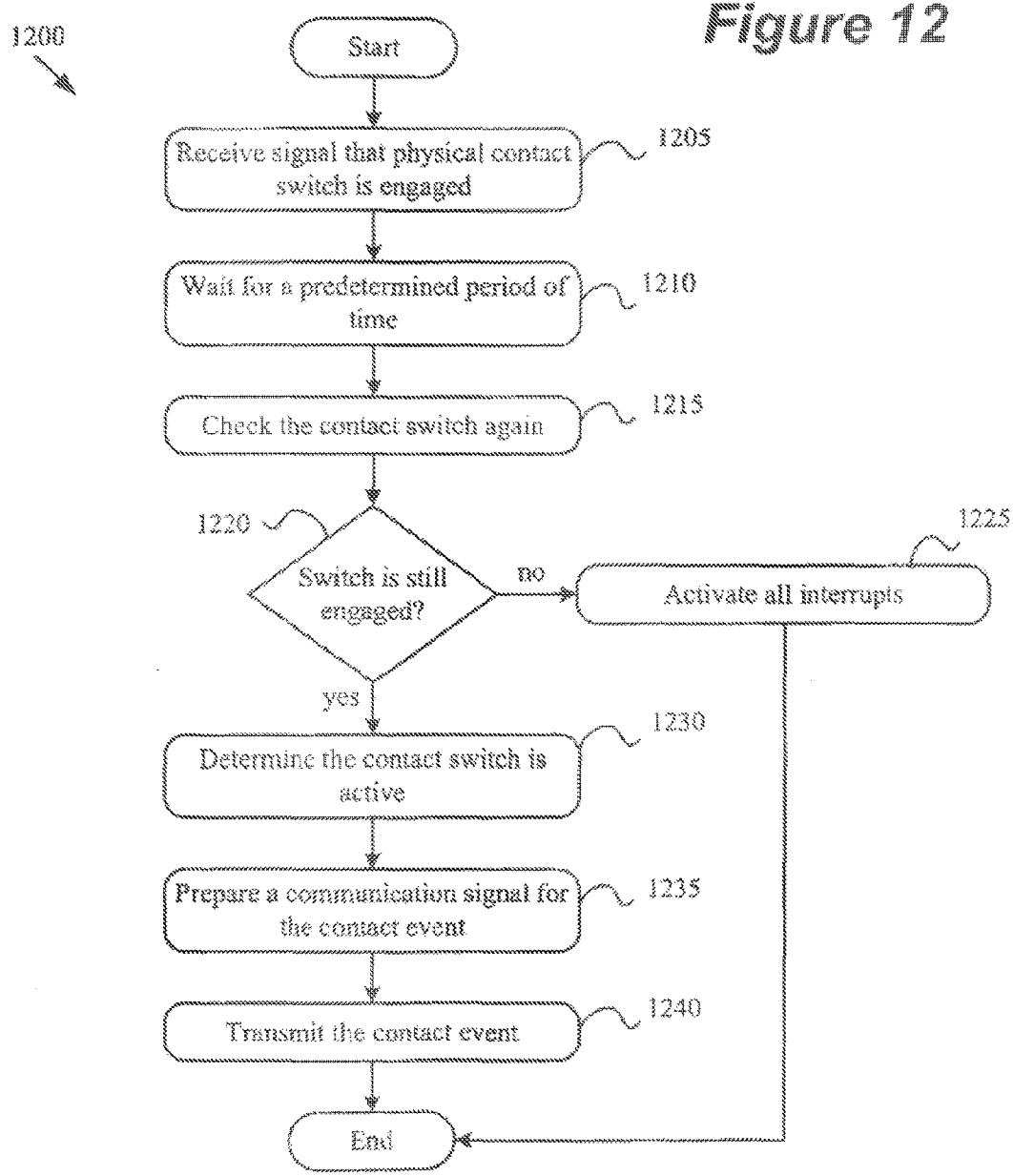
FIG. 12 conceptually illustrates a process used in some embodiments that uses a magnet adjacent to pressure deforming material and a magnetic sensor to determine when a pouring device is inserted in a container.

FIG. 12 conceptually illustrates a process of some embodiments by which a spout with a physical contact switch determines that it has been inserted into a container and signals that it has been inserted into a container. The process receives (at 1205) a signal from a physical contact switch indicating that the switch has been engaged. In some embodiments, the switch is engaged by pressure deforming material as described in relation to FIGS. 11A-11C. Once the switch has been activated, the process waits (at 1210) for a predetermined period of time. After the predetermined period has expired, the process checks (at 1215) the physical contact switch again. Next, the process determines (1220) whether the physical contact switch is still engaged.

When the switch is no longer engaged the process resets (at 1225) the spout (e.g., activates all hardware interrupts) to await the next activation of the switch and the process ends. Otherwise, when the switch is still engaged the process recognizes (at 1230) that the switch is still active. The process then prepares (at 1235) a communication signal for the contact event, e.g., to notify a system such as an inventory management computer that the spout has been inserted into a container. In some embodiments, the prepared communication signal includes a serial number or other identifier of the spout. The process then sends (at 1240) the communication signal identifying the contact event, e.g., to an inventory system.

Figure 13:
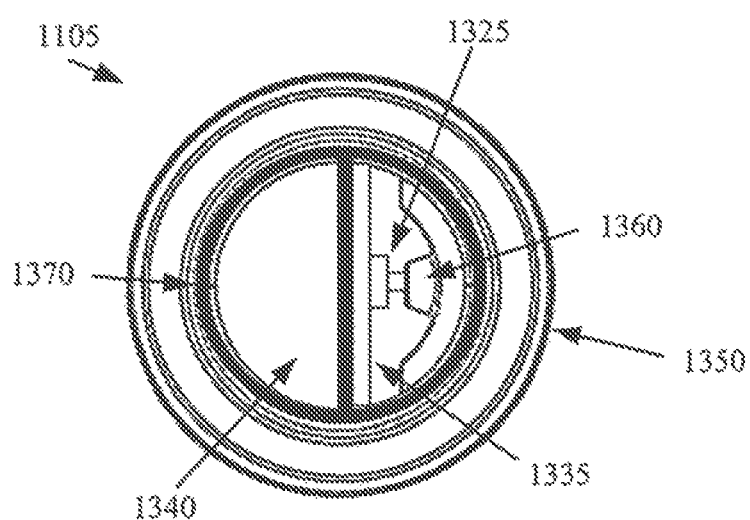
FIG. 13 illustrates a top down sectional view of some embodiments that use pressure deforming material to activate a contact switch which determines when a pouring device is inserted or removed from a container.

FIG. 13 illustrates a top down sectional view of a spout 1105 inserted into a container in some embodiments. As shown, the spout 1105 includes a flexible cork 1350 and a dispensing channel 1340. The spout 1105 also includes, enclosed in a hard casing 1370, a section of cork material 1360 bulging through the hard casing 1370 and a contact switch 1325 attached to a circuit board 1335. When spout 1105 is inserted into container, pressure is placed on the flexible cork 1350. The pressure on the flexible cork 1350 causes the section of pressure deforming material 1360 to push through the hole in the hard casing 1370, and press the contact switch 1325. Similarly, the removal of spout 1105 from container 100 removes the pressure from the flexible cork 1350 causing the section of pressure deforming material 1360 to shrink back through the hole in the hard casing 1370. When the section of pressure deforming material 1360 shrinks back, it no longer presses the contact switch 1325. The state of the contact switch 1325 (indicating that the spout is inserted or non-inserted) is captured through the circuit board 1335 and used to activate various functions within the firmware of the circuit board 1335.

IV. Accelerometer Based Pouring Sensor

FIGS. 14A-14B and FIG. 15 illustrate an accelerometer 1420 connected to a circuit board 1435 in some embodiments. In some embodiments, the accelerometer is a microelectromechanical system (MEMS). As shown, the spout 1405 includes a fluid flow channel 1440 and an accelerometer 1420 connected to a circuit board 1435. The accelerometer 1420 can be used to detect angles of inclination, time of inclination, and speed and direction of containers 100 and 1500 used to dispense liquids, gels, powders, and/or solid materials. As shown in FIGS. 14A-14B the accelerometer 1420 connected to a circuit board 1435 is installed in spout 1405 through which the material is poured from the container 100. FIG. 14A illustrates a circuit board 1435 and accelerometer 1420 that are aligned perpendicular to the fluid flow channel 1440 through which materials are poured from the container 100. FIG. 14B illustrates a circuit board 1435 and accelerometer 1420 that are aligned parallel to the fluid flow channel 1440 through which materials are poured from the container 100.

FIG. 15 illustrates an accelerometer 1420 that is not part of a spout through which material flows from a container, but is instead attached to a container 1500 in some embodiments. The accelerometer 1420 can be attached to the inside of the container 1500, as shown in 1510, or attached to the outside of the container, as shown in 1515. The accelerometer 1420 and circuit board 1435 may be enclosed in casing 1525 in some embodiments.

Figure 16:
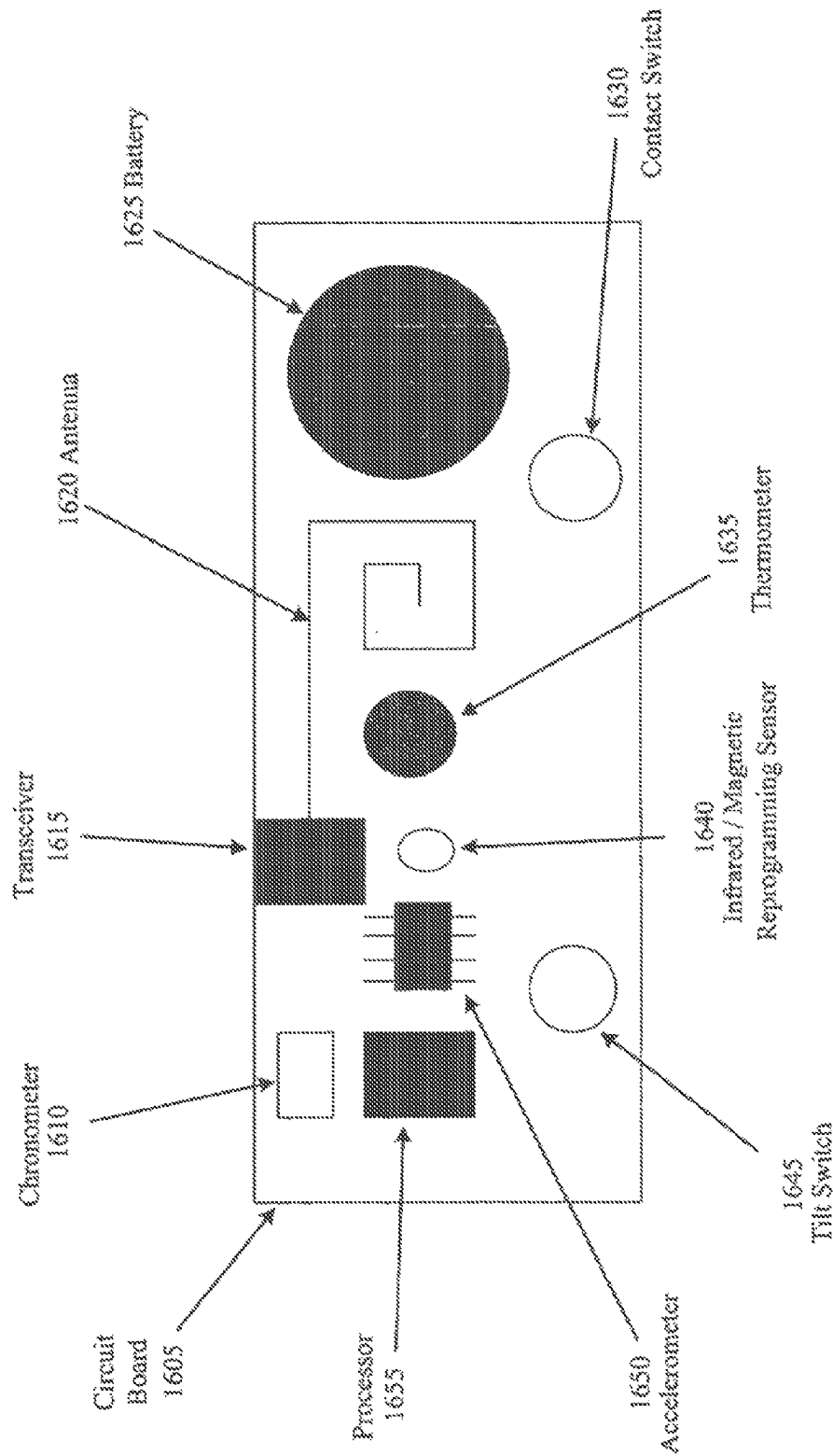
FIG. 16 illustrates a circuit board with various electronic components included in some embodiments.

FIG. 16 illustrates electronic components of some embodiments. As shown, the circuit board 1605 includes a chronometer 1610, a transceiver 1615, an antenna 1620, a battery 1625, a contact switch 1630, a thermometer 1635, a reprogramming sensor 1640, a tilt switch 1645, an accelerometer 1650, and a processor 1655. The circuit board 1605 can be a rigid or flexible board, and includes electronic components and electronic traces. The chronometer 1610 includes date and time information used to coordinate functions of the electronic components and the processor. The transceiver 1615 is modulated to a single or range of frequencies to transmit and/or receive data with coordinating devices. The antenna 1620 is set to an optimal length depending on the specific frequency (or frequencies) used and in some embodiments is etched on the circuit board. The battery 1625 can be either a primary or backup power source and can either be disposable or rechargeable.

The contact switch 1630 can be either physical or magnetic in activation properties and is used as a method to sense the attachment or detachment of the device from a container. The contact switch 1630 is also used as a power saving method as it is, in effect, an on/off switch for the device in some embodiments. The thermometer 1635 measures the temperature of material dispensed from the container for calculating an accurate flow rate. The reprogramming sensor 1640 receives data from an outside transmission source to reprogram the functions conducted by the various components on the circuit board 1605. The tilt switch 1645 is a contact switch using a metal ball and contacts or mercury and contacts that is oriented to a specific plane to the earth's horizon. When the tilt switch 1645 is moved beyond its plane of horizon, the metal ball or mercury touches a contact which sets the switch to active. The tilt switch 1645 can be used to activate sensor input, as a secondary on/off switch for the entire device, or both. The accelerometer 1650 measures speed, direction and angle of the unit in relation to a fixed point in either 2 dimensions (i.e. movement across a table) or 3 dimensions (i.e. movement up, down, left, right, forward, backwards). The processor 1655 of some embodiments includes the onboard memory, firmware program and logic functions. The processor 1655 can be either single cycle (i.e. one processing speed) or multi-cycle (i.e. multiple processing speeds). The slower the processor speed, the more time it takes to calculate/function but the less energy is used. A multi speed processor is used to optimize the performance of the calculations and the power utilization, which is particularly important when the device is used with a battery.

A. Measuring of Angles

Figure 17:
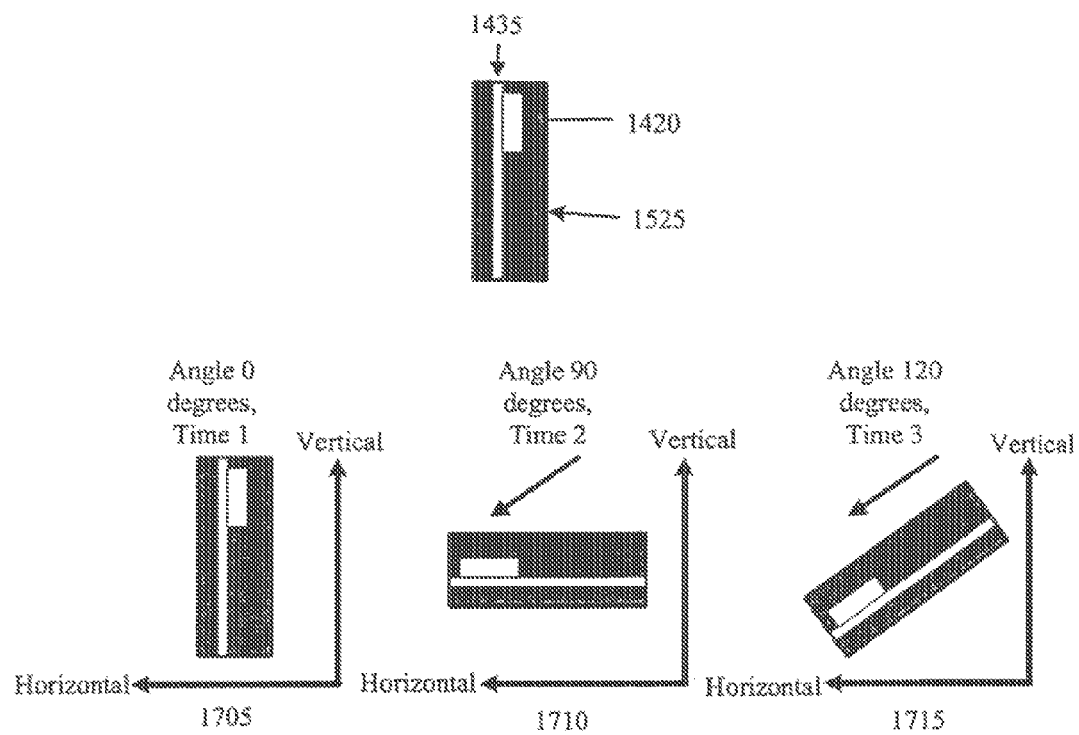
FIG. 17 illustrates the use of an accelerometer to measure the angle of a container at different times.

FIG. 17 illustrates an example of using the accelerometer 1420 with circuit board 1435 to record multiple angles of inclination of a container in some embodiments. As shown, the accelerometer 1420 and circuit board 1435 are enclosed in casing 1525. In FIG. 17, the accelerometer 1420 and circuit board 1435 are attached to the container or a spout (not shown) such that they are vertically aligned with the container when the container is upright in some embodiments. In some embodiments, the accelerometer 1420 and circuit board 1435 are attached such that they are horizontally aligned with the container when the container is upright. FIG. 17, in portion 1705, shows the accelerometer 1420 and circuit board 1435 measuring the angle at 0 degrees at time point 1. FIG. 17, in portion 1710, shows the accelerometer 1420 and circuit board 1435 measuring the angle at 90 degrees at time point 2. FIG. 17, in portion 1715, shows the accelerometer 1420 and circuit board 1435 measuring the angle at 120 degrees at time point 3. The accelerometer 1420 and circuit board 1435 measure the angle of the container to which they are attached over the finite period of time from time point 1 to time point 2 to time point 3.

B. Measuring Speeds and Directions

Figure 18:
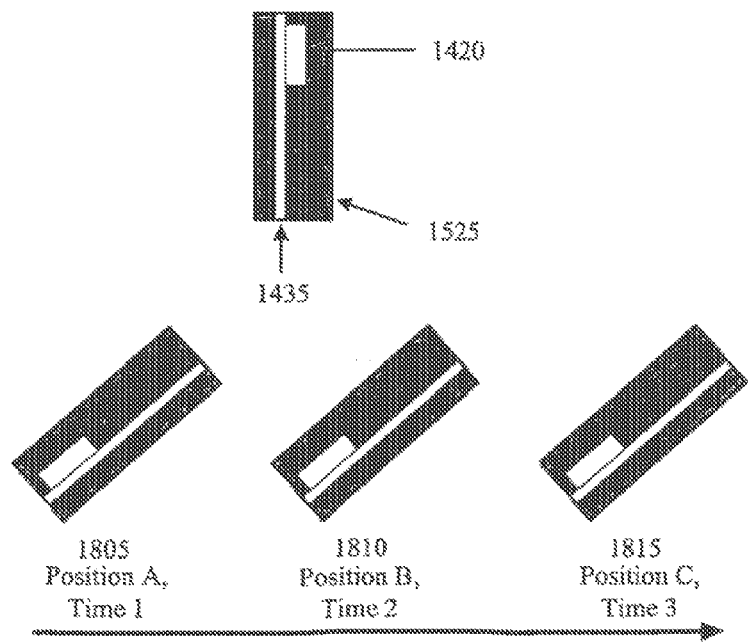
FIG. 18 illustrates the use of an accelerometer to measure the position of a container at different times.

FIG. 18 illustrates an accelerometer 1420 with circuit board 1435 that records multiple speeds and directions of a container through a series of motions or movements through a finite period of time in some embodiments. As shown, the accelerometer 1420 and circuit board 1435 are enclosed in casing 1525. FIG. 18, in portion 1805, shows the accelerometer 1420 and circuit board 1435 located at position A at time point 1. FIG. 18, in portion 1810, shows the accelerometer 1420 and circuit board 1435 located at position B at time point 2. FIG. 18, in portion 1815, shows the accelerometer 1420 and circuit board 1435 located at position C at time point 3. The accelerometer 1420 and circuit board 1435 measure the speed and direction of the container (not shown) to which they are attached as it moves from position A to position B to position C over the finite period of time from time point 1 to time point 2 to time point 3.

A practical application of measuring speed and direction is the ability to detect if dispensing occurs at one location or occurs at multiple locations. For instance, a bartender at a bar may dispense six ounces of fluid. If the dispensing occurs without a change in direction or speed, it can be deduced that only one container (e.g., a glass) was filled with fluid. However, if a bartender at a bar dispenses six ounces of fluid and speed and motion are detected simultaneously with the dispensing of the fluid, then it can be deduced that the fluid was dispensed over multiple containers (e.g., multiple glasses).

An accelerometer or multiple accelerometers used in tandem can deduce speed and direction not just in 2 dimensions, but in 3 dimensions. Therefore, speed and direction can be determined for the directions up, down, left, right, forwards and backwards. Given a known starting point and the time of the motion while detecting speed and direction of motion in three dimensions, the ending point of the motion can be determined. For instance, if a bartender takes a bottle from a holder at the front of a bar and that bottle is known to start from the well and the bottle is carried behind the bartender to a shelf, then the bottle will be known to be placed on the shelf as the ending point because the speed, direction and time of travel is known.

C. Measuring Time of Inclination, Speed and Direction

Figure 19:
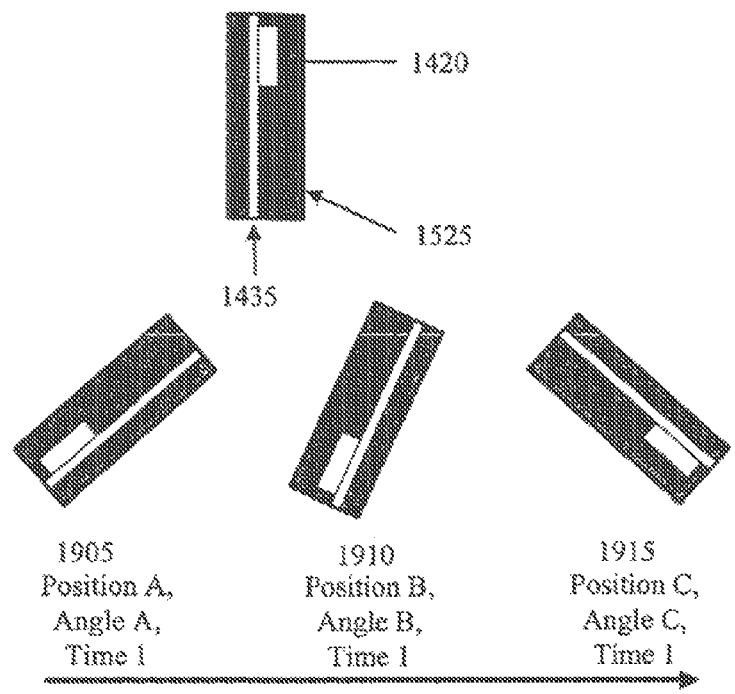
FIG. 19 illustrates the use of an accelerometer to measure the position and angle of a container at different times.

FIG. 19 illustrates an accelerometer 1420 with a circuit board 1435 that records one or more time intervals in which it detects angles, directions, and speeds in some embodiments. As shown, the accelerometer 1420 and circuit board 1435 are enclosed in casing 1525. FIG. 19 in portion 1905, shows the accelerometer 1420 and circuit board 1435 located at position A and inclined at angle A at time point 1. FIG. 19, in portion 1910, shows the accelerometer 1420 and circuit board 1435 located at position B and inclined at angle B at time point 2. FIG. 19, in portion 1915, shows the accelerometer 1420 and circuit board 1435 located at position C and inclined at angle C at time point 3. The accelerometer 1420 and circuit board 1435 record the time intervals from time point 1 to time point 2 to time point 3, as well as the angle of the container (not shown) and speed and direction of the movement from position A to position 13 to position C over the same time intervals.

D. Power Saving Methods

In some embodiments, a method is employed to reduce power consumption by the accelerometer. In some embodiments, the software on a circuit board 1435 with an accelerometer 1420 is programmed to reduce the number of cycles or intervals of time in which measurements or readings are taken from the accelerometer 1420 while the accelerometer 1420 is not in motion. When motion is detected, the software on the circuit board 1435 increases the number of cycles or intervals of time in which measurements or readings are taken from the accelerometer 1420, until the accelerometer 1420 is no longer in motion.

Figure 20:
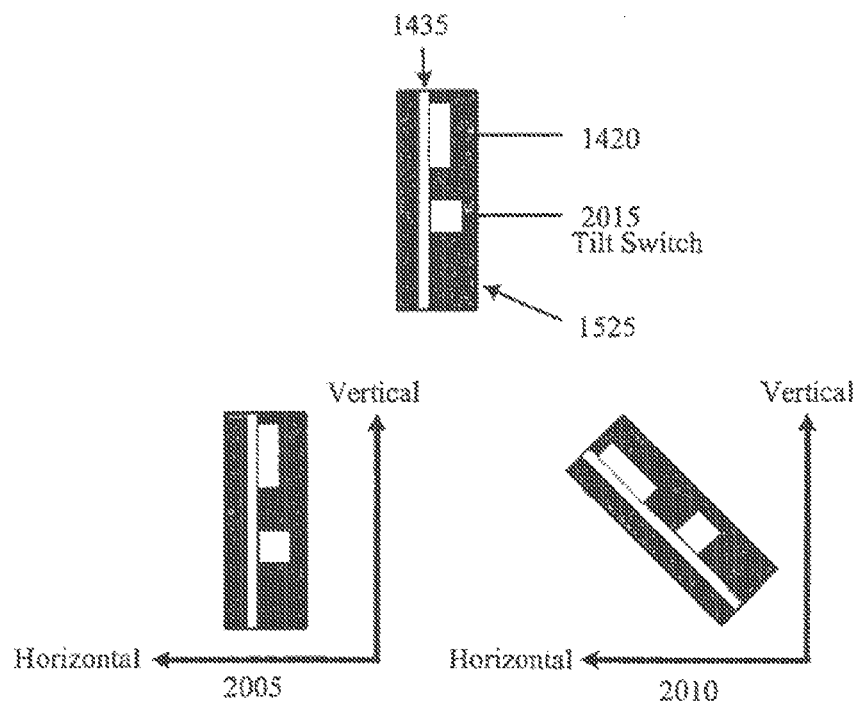
FIG. 20 illustrates the use of a tilt switch to determine when a container has been moved from its non-inclined position.

FIG. 20 illustrates a method to reduce power consumption by an accelerometer 1420 in some embodiments. As shown, the accelerometer 1420 and a tilt switch 2015 are attached to a circuit board 1435, and enclosed in casing 1525. In these embodiments, the software controlling the circuit board 1435 is programmed such that the tilt switch 2015 being within a range of angles around a base angle fully deactivates the accelerometer or reduces the frequency with which measurements or readings are taken from the accelerometer 1420. The software controlling the circuit board 1435 is programmed in such a way that the tilt switch 2015 being within a different range of angles fully activates the accelerometer or increases the frequency with which measurements or readings are taken from the accelerometer 1420. In some embodiments, the range of angles in which the tilt switch 2015 activates or increases the frequency with which measurements or readings are taken from the accelerometer 1420 is all angles except for the range of angles around the base angle at which the tilt switch 2015 fully deactivates the accelerometer or reduces the frequency with which measurements or readings are taken from the accelerometer 1420. In portion 2005, FIG. 20 shows the tilt switch 2015 at a base angle of 0 degrees, and therefore the power to the accelerometer 1420 is off and no measurements are taken. In portion 2010, FIG. 20 shows the tilt switch 2015 at an angle sufficiently far from the base angle that the power is supplied to the accelerometer 1420 and measurements from the accelerometer 1420 are taken.

In some embodiments, frictional vibrations, detected when material is being dispensed from the container, are used to activate the device. The dispensing of liquids, gels, powders, or solids from a container creates frictional vibrations within the container. Some embodiments with an accelerometer measure the angles, times, speeds, and directions of a container dispensing liquids, gels, powders, or solids, and also detects frictional vibrations with the accelerometer. In some embodiments, when an accelerometer 1420 detects these frictional vibrations, software within the circuit board 1435 determines and indicates that the vibrations are caused by the liquids, gels, powders, or solids being dispensed. When these vibrations are not sensed by the accelerometer 1420, software within the circuit board 1435 determines and indicates that vibrations from liquids, gels, powders, or solids being dispensed are not present.

Figure 21:
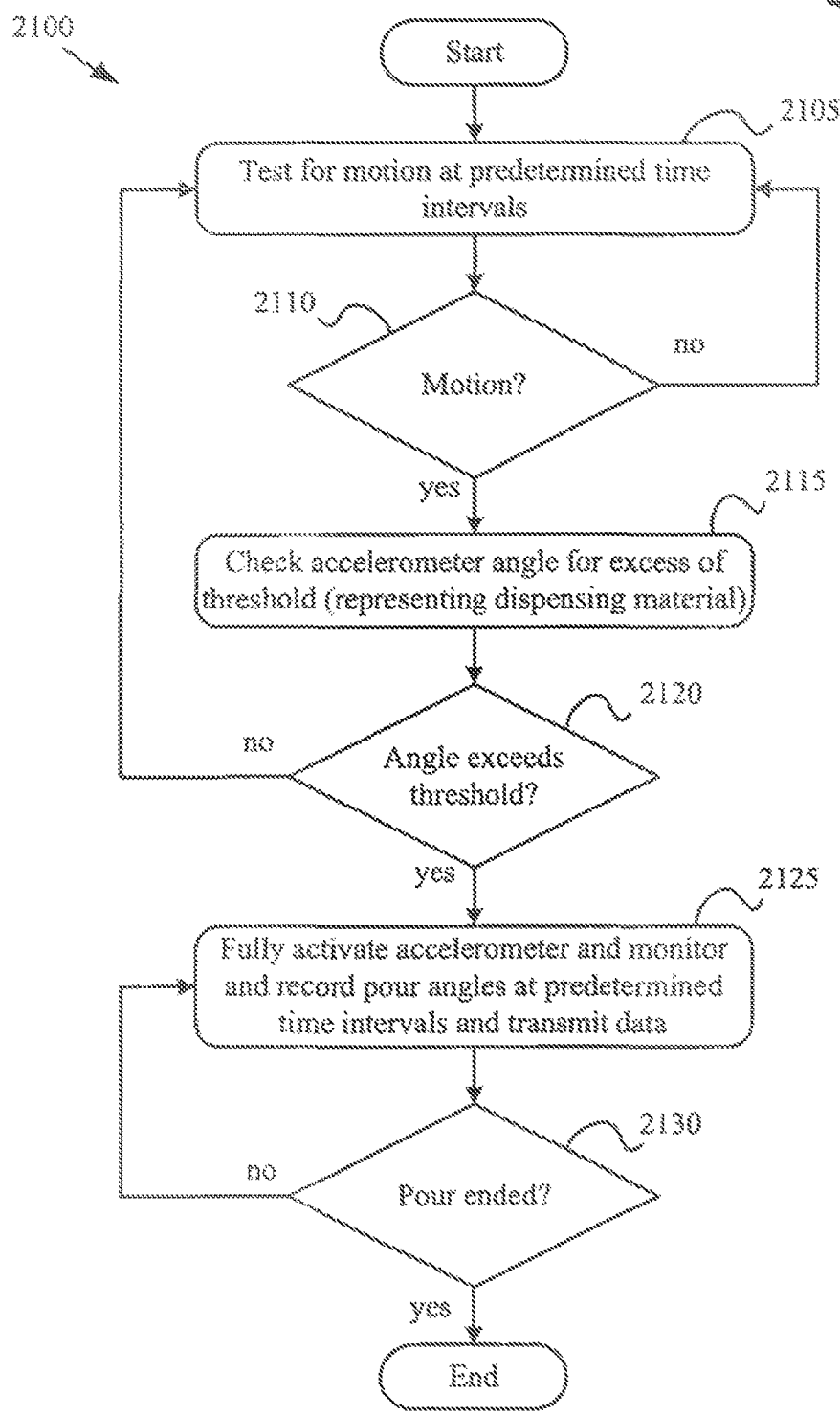
FIG. 21 conceptually illustrates a process of some embodiments for monitoring, recording, and transmitting pour data with an accelerometer.

FIG. 21 conceptually illustrates a process 2100 of some embodiments for saving power of a spout. In some embodiments, the process 2100 is performed by a microcontroller of a spout which controls an accelerometer of the spout. The process activates (at 2105) an accelerometer at preset intervals (e.g. 0.5 seconds, though other intervals are used in other embodiments) to check for motion, e.g., vibration or tilting. By activating the accelerometer at relatively infrequent intervals, rather than keeping the accelerometer constantly active, the process saves energy that would be consumed by more frequent checks for motion.

Next, the process determines (at 2110) whether a signal for the accelerometer indicates motion. When the process does not receive a signal from the accelerometer that indicates motion, the process returns to operation 2105 and keeps testing at the predetermined time intervals. Otherwise, when the process does receive a signal from the accelerometer that indicates motion, the process checks the accelerometer angle to determine whether the angle exceeds a threshold that indicates that material is being poured. Next, the process determines whether the angle does exceed the threshold. When the angle exceeds the threshold, the process proceeds to operation 2105 which was described above. Otherwise, when the angle does exceed the threshold, the process fully activates (at 2125) the accelerometer and monitors and records the angles of the spout at more frequent intervals (e.g., 0.125 seconds, though other intervals are used by other embodiments).

Next, the process determines (at 2130) whether the material is still being poured. When the material is still being poured, the process returns to operation 2125 and continues to closely monitor the angle of the spout. Otherwise, when the process determines (at 2130) that the pouring has stopped (e.g., the angle of the spout drops below some threshold angle that in some embodiments is different from the threshold angle of operation 2120) then the process ends. One of ordinary skill in the art will understand that in some embodiments, when the process ends, the process then resumes monitoring for motion (e.g., returns to operation 2105).

E. Temperature Sensing Component

In some embodiments, a circuit board includes a temperature sensing component that is placed in close proximity to or in direct contact with the liquid, gel, powder, or solid flow channel. Placing the temperature sensing component in close proximity, to or in direct contact with flow channel allows the temperature of the material dispensed to be recorded during dispensing. This information, once recorded, is stored and/or transmitted. The temperature is used to more accurately calculate the amount of liquid, gel, powder, or solid dispensed by providing a more accurate flow rate. In these embodiments, software calculates the volume of liquids, gels, powders or solids dispensed as proportional to the length of time the material was dispensed, the angles at which the material was dispensed, and the flow rates. The flow rates are based on the dispensing angles and recorded temperature for the dispensed material.

FIG. 22 conceptually illustrates a process 2200 of some embodiments by which a spout measures the temperature of material being dispensed from a container along with the pour data to increase the accuracy of the pour data. In some embodiments, the process is performed by a spout. The process generates (at 2205) pour data regarding the dispensing of material from a container as discussed above. The process measures (at 2210) the temperature of the material being dispensed from the container. The process then transmits (at 2215) the pour data and the measured temperature to a computer in some embodiments. In other embodiments, the process transmits the data to an external system. The process then ends.

F. Measuring the Volume of Liquids, Gels, Powders, or Solids Dispensed

In some embodiments, the accelerometer and other parts of the spout measure the angles, times, speeds and directions of a container that dispenses liquids, gels, powders, or solids for which the flow rate of the dispensed material at a given angle is known. In these embodiments, software calculates the volume of liquids, gels, powders, or solids dispensed as a function of the length of time the material was dispensed, the angles at which the material was dispensed, and the flow rates at those angles for the dispensed material.

In the measuring of the dispensing of liquids, gels, powders, or solids, the material to be dispensed will be known, whether the materials are liquids like pure water, vodka, or a sulfuric acid solution, a silicon based gel, or talcum powder, etc. The specific dispensing rate for a baseline material, such as pure water, for any specific container that is monitored will also be known, in some embodiments, the dispensing rate is determined by a removable and specifically designed mechanical dispenser with a fixed and known diameter for pouring and specific pour characteristics. In other embodiments, the specific dispensing rate is determined by direct measurements of the opening of a container with a spout and/or by trial dispensing with a baseline material, such as pure water, in order to determine the dispensing rate. When the dispensing rate is determined through trial dispensing of a baseline material, the trials and measurements are performed at multiple angles, since the angle of dispensing affects flow rates.

Figure 23A:
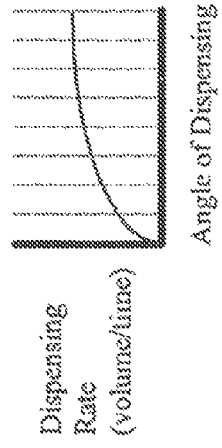
FIGS. 23A-23C illustrate graphs showing the relationship between the dispensing rate and the angle of dispensing, and the difference in dispensing rate of materials with a different viscosity or density.
Figure 23B:
Figure 23C:
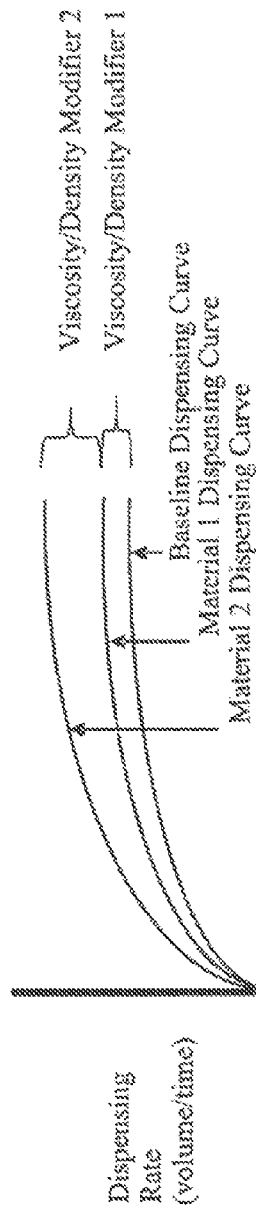

FIG. 23A shows a series of dispensed volumes for the baseline material are recorded over a known sequence of time for a fixed angle. FIG. 23B shows a composite of the various angles are combined to create the dispensing rate slope. FIG. 23C shows slopes created for various materials compared to the baseline material based on the material viscosity for fluids and gels or the density for powders and solids. In some embodiments, the baseline material may be more viscous and/or denser than some or all of the materials dispensed. In some embodiments, the baseline material may be less viscous and/or less dense than some or all of the materials dispensed.

The following are mathematical formulas for determining the volume of material dispensed using this principle. Determining the volume over a time sequence at a fixed angle is expressed by the following equation (A).

$$V_1 = DR_1 * t_1[\text{Angle}_1] \qquad (A)$$

Where, $V_1$ is the volume dispensed for a given amount of time ($t_1$) and $DR_1$ equals the dispensing rate (volume/time), for a particular angle ($\text{Angle}_1$).

Determining the volume over a time sequence at a various angles is expressed by the following equation (B).

$$V = \Sigma V_x = \Sigma(DR_x * t_x[\text{Angle}_x]) \qquad (B)$$

Where, $V_x$ is the volume dispensed for a given amount of time ($t_x$) with a varying number of angles ($\text{Angle}_x$) and the corresponding dispensing rate ($DR_x$) for each given angle in the series.

Determining the volume over a sequence of time using angular average is expressed by the following equation (C).

$$V = DR_1 * t_1[\text{Average of Angle}_x] \qquad (C)$$

Where, V is the volume dispensed for a given amount of time ($t_1$) by multiplying time by the dispensing rate ($DR_1$) for the average of the sum of angles for an angular series, recorded over that time period (Average of $\text{Angle}_x$).

G. Offset Compensator to Adjust for Dispensing Momentum from a Non-dispensing State to a Dispensing State When a container begins to pour out a material, the material rushes from the base of the container to the mouth of the container. That is, when a container with liquid, gels, powders, or solids, first achieves enough inversion of angle to use gravity to dispense material the material usually has the additional acceleration from its fall from the base of the container. The acceleration of material can cause a degree of inaccuracy in predicting the amount of material dispensed as per the calculations described above. In some circumstances, the calculated volume dispensed is multiplied by an offset number, greater than one if increasing the volume, less than one if decreasing the volume, or one to leave the volume the same, to compensate for the acceleration of material in the initial physical action of dispensing material. In effect, this changes the intercept of the pouring slope. This is accomplished through a simple formula: Volume×Offset.

H. Time, Angle and Volume Measurement Process

FIG. 24 conceptually illustrates a process 2400 of some embodiments for measuring a volume of material dispensed by tracking the angle of the container during the dispensing. The process determines (at 2405) whether a spout has been inserted into a container. When the spout has not been inserted into a container, the process ends. Otherwise, when the spout has been inserted into the container, the process measures (at 2410) the angle of the spout (or in some embodiments, the angle of the container). Next the process determines (at 2415) whether the current angle does not exceed a first threshold angle (e.g., an angle at which the material in the container begins to pour). When the current angle does not exceed the first threshold, the process returns to operation 2410. Otherwise, the process tracks (at 2425) the angle of the spout for a predetermined time interval. After that time interval, when the process determines (at 2425) that the current angle of the spout is greater than a second threshold angle (e.g., determines that the material is still being poured) then the process returns to operation 2420. Otherwise, when the process determines that the current angle of the spout is less than a second threshold angle (e.g., determines that the material is no longer being poured), then the process uses (at 2430) the tracked angles over the time intervals to determine the volume poured and the process ends. A more detailed description of the process that some embodiments use to determine pour volume is illustrated in FIG. 25.

Figure 25A:
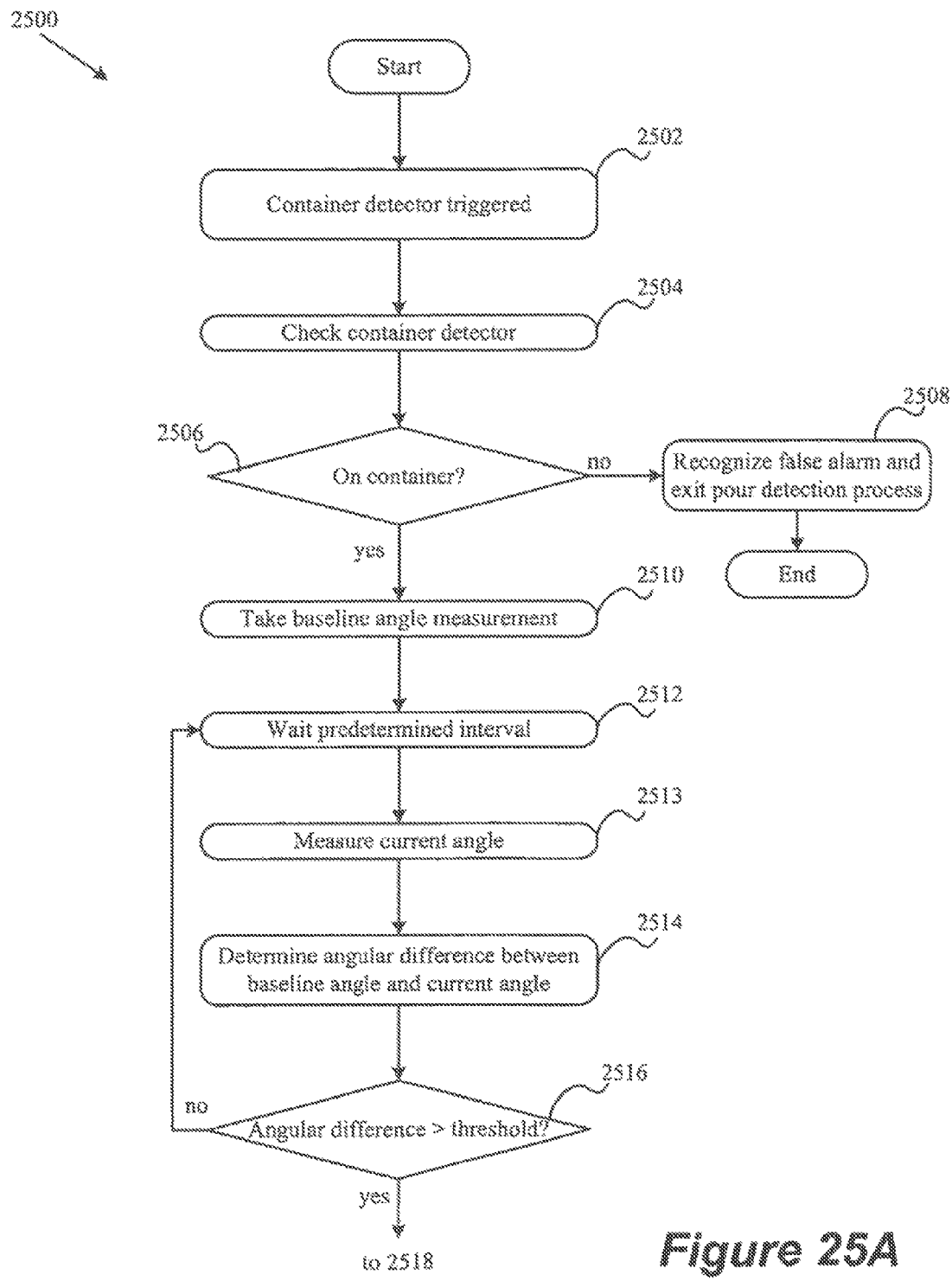
FIGS. 25A-25B illustrate a process of some embodiments for a device that calculates the volume of material dispensed from a monitored container by measuring the angle of inclination and duration of time material is being dispensed.
Figure 25B:
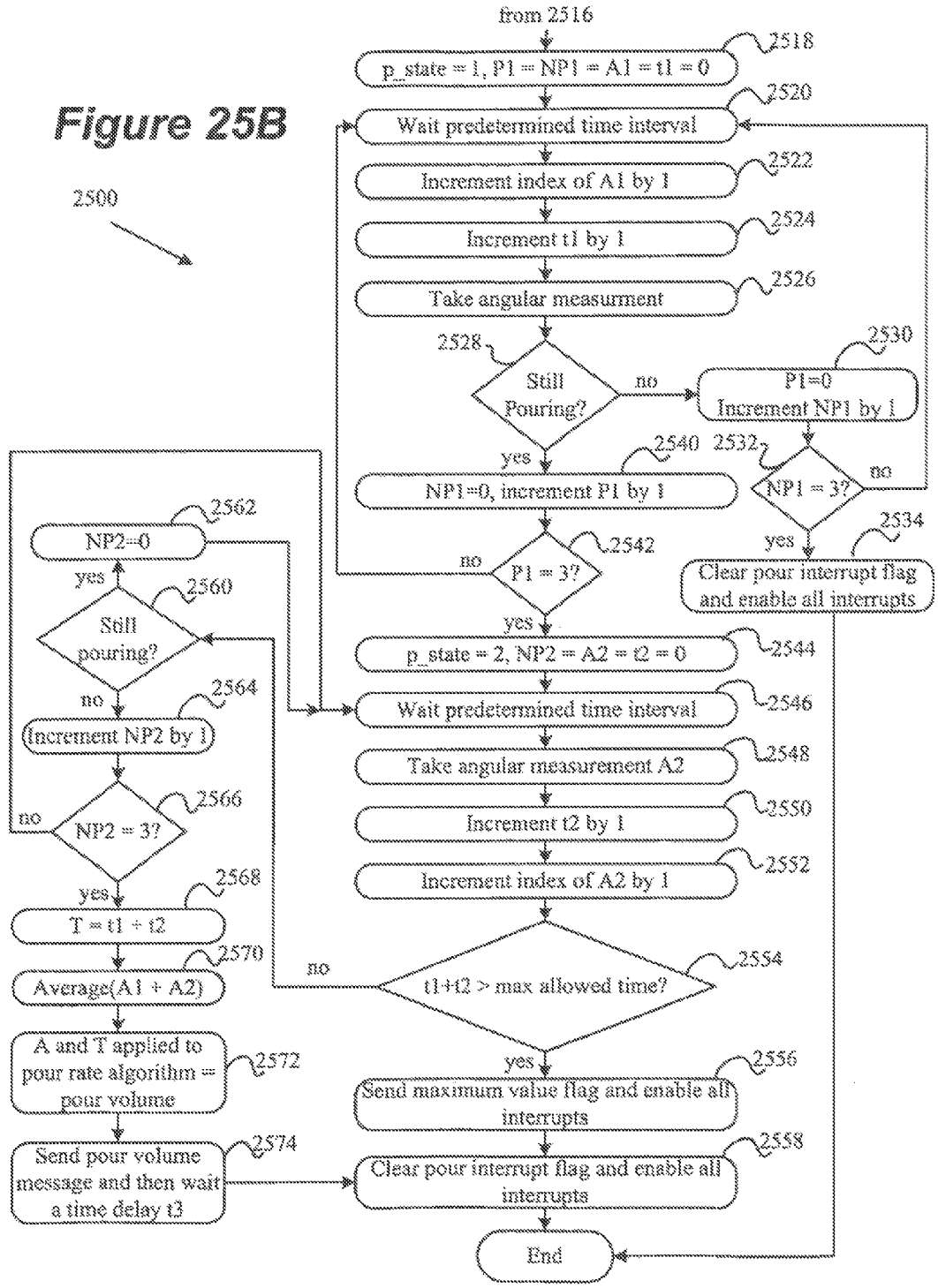

FIGS. 25A-25B conceptually illustrate a process of some embodiments for measuring pour volumes. Specifically, FIGS. 25A-25B show a time-angle-volume measurement process used by the spout of some embodiments to measure the duration of periods when material is being dispensed, the angle of inclination during these periods, and the calculation of volume dispensed from a monitored container in some embodiments.

The process 2500 is triggered by the activation of an insertion detector (e.g., a hardware power connection switch) on the spout. In some embodiments, the insertion detector may be a magnetic sensor or physical contact switch as described above. In some embodiments, measurements and other actions in the process are controlled by an internal processor of the spout. In other embodiments, an external processor may control the process. Operations 2502-2508 collectively determine whether the spout has been put on a container. The process receives an insertion detector signal (at 2502), e.g., a hardware interrupt that indicates that the spout has been placed in a container for pouring. The process checks (at 2504) the status of the detector. The process determines (at 2506) whether the detector continues to indicate that the spout is on the container (e.g., whether the detector was incidentally activated, such as by some accidental contact or whether the spout has been put on a container). When the detector does not continue to indicate that the spout is on the container, the process recognizes (at 2508) that the spout has not been inserted into a container and ends.

Otherwise, when the detector does continue to indicate that the spout is on the container, then the process 2500 measures (at 2510) a baseline angle of an angle monitor (e.g., an accelerometer used to measure the angle of inclination of the spout) in the spout. In some embodiments, the baseline is the angle of the angle monitor when the container is upright. The process waits (at 2512) for a predetermined period of time (e.g., 0.125 seconds, though other embodiments use other time intervals), and measures (at 2513) the current angle of the angle monitor. The process determines (at 2514) the difference between the baseline angle and the current angle. Next the process compares (at 2516) the angular difference to a threshold value. When the angular difference does not exceed the threshold value, the process returns to operation 2512, which was described above.

Otherwise, when the angular difference exceeds the threshold value, the container is (at 2518) in a pouring state. Operations 2518-2574 are illustrated in FIG. 25B. The process sets (at 2518) a variable p_state to 1. The process also sets (at 2518) each of the following variables to zero: 1) a pouring variable P1, 2) a non-pouring variable NP1, 3) a first-time-period variable t1, and 4) all values of a multi-value angle variable A1 (e.g., an indexed variable, list, or other data structure) representing the angle of the pour at multiple times.

Operations 2518-2532, 2540, and 2542 collectively determine whether the container was only at a pouring angle for a brief moment, or is actually pouring, e.g., whether the bottle was merely jostled or is being held in a pouring position. The process waits (at 2520) for a predetermined amount of time, in some embodiments 0.125 seconds. In other embodiments the process waits for different amounts of time. After waiting, the process increments (at 2522) the index of the angle variable A1 by 1, stores the current angular measurement at the new index location of angle variable A1, and increments (at 2524) the time variable by 1. The process then takes (at 2526) a new angular measurement.

The process determines (at 2528) whether the container is still pouring, e.g., whether the angular difference between the new angular measurement and the baseline measurement is less than the threshold angle. When the angular difference is less than the threshold value, the process increments (at 2530) the non-pour value NP1 by 1 and sets the pour variable P1 to 0. These settings for the variables indicate that, as of the new angular measurement, the container was not pouring. The process then determines (at 2532) whether the non-pour variable NP1 equals a preset number (for convenience, the number 3 is used as an example here and in FIG. 25B, however other embodiments use other numbers), indicating that for all three of the previous three predetermined time periods the container has not been at an angle which would result in pouring. When the container has been non-pouring for less than three of the predetermined time periods, the process returns to 2520 to repeat the operations that check whether the container is pouring.

When the process determines (at 2532) that the container has been non-pouring for the previous three predetermined time periods, then the detection (back at 2516) of an angular difference exceeding the threshold angle is treated as a false pour detection signal. In some embodiments, three predetermined periods of time are a short enough time to allow only a negligible amount of material to be dispensed from the container. Otherwise, when the process detects (at 2532) a false pour, the process clears (at 2534) the pour interrupt flag and enables all the interrupts. The process then ends. One of ordinary skill in the art will understand that in some embodiments, when the process ends, the process then restarts from the beginning (at 2505) and again determines whether the spout is on a container.

When the process determines (at 2528) that material is still being dispensed it increments (at 2540) the pour variable P1 by 1 and sets the non-pour variable NP1 to 0. These settings for the variables indicate that, as of the new angular measurement, the container was pouring. The process then determines (at 2542) whether the pour variable P1 equals a preset number (for convenience, the number 3 is used as an example here and in FIG. 25B, however other embodiments use other numbers), indicating that for all three of the previous three predetermined time periods the container has been at an angle which would result in pouring. When the process determines (at 2542) that the container has been pouring for less than three of the predetermined time periods, the process returns to step 2520 to repeat the operations that check whether the container is pouring.

Otherwise, when the process determines (at 2542) that the container has been pouring for the previous three predetermined time periods, then the detection (back at 2516) of an angular difference exceeding the threshold angle is treated as a true pour detection signal. The validity of the pour detection signal is confirmed, and the container is confirmed as dispensing material because the angular difference between the baseline angle and the current angle remained beyond the threshold for longer than three of the predetermined time periods. The time period t1 measured until now represents the duration of the pour and all angular measurements A1 represent the angles during the time duration period t1.

The process sets (at 2544) a variable p_state to 2. The process also sets (at 2544) each of the following variables to zero: 1) a non-pouring variable NP1, 2) a second-time-period variable t2, and 3) all values of a multi-value angle variable A2 (e.g., an indexed variable, list, or other data structure) representing the angle of the pour at multiple times. The process then waits (at 2546) for a predetermined time interval then takes (at 2548) an angular measurement and increments (at 2550) t2 by 1, increments (at 2552) the index of angle variable A2 by 1 and stores the angular measurement in the new index location of angle variable A2. The process compares (at 2554) the total time of the pour to a maximum time value. When the process determines (at 2554) that the maximum value is exceeded, the process determines that the dispensing exceeded a reasonable period of time and the value for the amount poured should be discarded. The process transmits (at 2556) a maximum value flag through a transceiver clears (at 2558) all interrupts, and ends. One of ordinary skill in the art will understand that in some embodiments, when the process ends, the process then restarts from the beginning (at 2505) and again determines whether the spout is on a container.

Otherwise, when the process determines (at 2554) that the total time of the pour does not exceed its maximum value, it determines (at 2560) whether it is still pouring/dispensing material. When the container is determined (at 2560) to be still pouring, then the process sets (at 2562) the non-pour variable NP2 to 0, and then returns to operation 2546, which was described above. Otherwise, when the container is determined (at 2560) not to be pouring, then the process increments (at 2564) the non-pour variable NP2 by 1. The process then determines (at 2566) whether the non-pour variable equals a preset number (for convenience, the number 3 is used as an example here and in FIG. 25B, however other embodiments use other numbers) and thus whether the pouring has been stopped for three consecutive predetermined time periods. When the process determines (at 2566) that the non-pour variable does not equal the preset number, the process returns to operation 2546, which was described above.

Operations 2568-2574 collectively calculate the volume of the pour. When the process determines (at 2566) that the pouring is complete, the process adds (at 2568) the first and second time periods t1 and t2. The process also averages (at 2570) the first and second sets of angle values A1 and A2. The process then calculates (at 2572) the pour volume based on the time interval, average of the angles of pour and the baseline dispensing rates for the substance being poured from the container and any necessary offset numbers (to account for other factors, e.g., temperature, viscosity, etc). In the embodiment illustrated in FIG. 25A-25B, the pour volume is calculated based on the average of the angles during the pouring time. However, in some embodiments, the pour volume is calculated by applying a pour rate algorithm, which relates the angle of the spout to the rate at which the material pours, to each angle value of A1 and A2 individually and adding the amounts determined by the algorithm for each angle, rather than averaging the angles first and applying a formula that uses the average angle.

The process then sends (at 2574) the pour information via a signal from the transceiver. In some embodiments, this pour signal includes the volume value, transmission sequence number, unique device identifying number (serial number) and any additional relevant sensor data including time, date, temperature, and humidity. After transmission, the process clears all interrupts and then enables them again (at 2558). The process then ends. One of ordinary skill in the art will understand that in some embodiments, when the process ends, the process then restarts from the beginning (at 2505) and again determines whether the spout is on a container.

I. Software Based Adjustments to Volume Transmissions Based on Sensor Data

FIG. 1 illustrates a spout working as part of a system in which computing devices 130, 135, and 140 receive the device data through various networking and communications topologies in some embodiments. The computing devices have software which allows the data from the pouring devices to be stored, processed and manipulated. The application uses lookup tables and algorithms to take the data based on a baseline material and apply viscosity and density modifiers to derive new volumes values that reflect the actual material dispensed.

Figure 26:
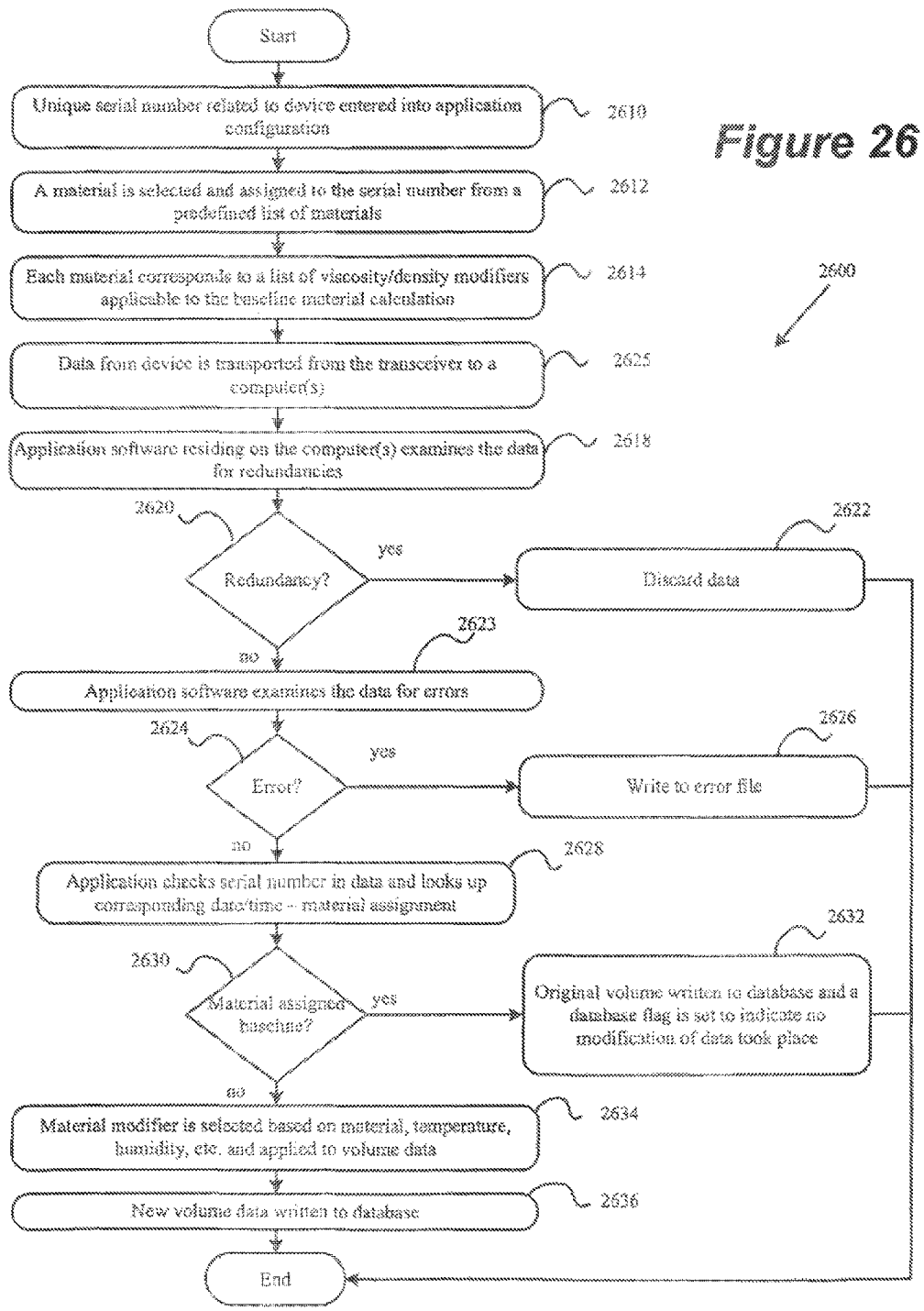
FIG. 26 conceptually illustrates a process of some embodiments for a computer system to process data from a spout.

FIG. 26 conceptually illustrates a process of some embodiments by which a computer application is configured and processes data from a spout. The process receives (at 2610) the spout's unique serial number into a computer application either through manual or automatic number entry. The process receives (at 2612) a selection of a material, from a list of materials provided by the application and associates that material with the serial number. In some embodiments, materials on the list are each associated with viscosity and density modifiers. In some embodiments, the viscosity and density modifiers are correlated with secondary information such as temperature ranges, humidity ranges, pressure ranges, solution concentration ranges, etc. In some such embodiments, the process retrieves (at 2614) the modifiers for the selected material.

The process receives (at 2616) data (e.g., the serial number) at the application from the spout (e.g., from a transceiver of the spout to one or many computers running the application). The process examines (at 2618) the incoming data for redundancies. In some embodiments the examination is by the application while it runs on one or more computers. When a redundancy is detected (at 2620), such as when the same spout sends the same data multiple times, the redundant data is discarded (at 2622) and the process ends. Otherwise, when a redundancy is not detected (at 2620), the process checks (at 2623) the data for errors. When an error is detected (at 2624) then the data is written (at 2626) to an error file and the process ends. Otherwise, when an error is not detected (at 2624) then the application checks (at 2628) the serial number in the data and looks up the material assigned to the serial number based on the data/time stamp of the data.

When the process determines (at 2630) that no assignment has been made or that the assignment is the same material as the baseline material, the original volume is written (at 2632) to the database, a database flag is set (also at 2632) to indicate that no data modification took place and the process ends. Otherwise, when the process determines (at 2630) that an assignment has been made (of a material to the serial number), the process selects (at 2634) a material modifier based on the associated data from the device such as temperature, humidity, etc. and applies (also at 2634) the modifier to the baseline material volume data. The new volume data is written (at 2636) to the database and the process ends.

V. Reprogramming a Spout Through an Infrared or Magnetic Sensor

A fully assembled and functioning spout can have a change made to its firmware programming, dispensing rate calculation methods and factors without having to physically open the spout.

Figure 27:
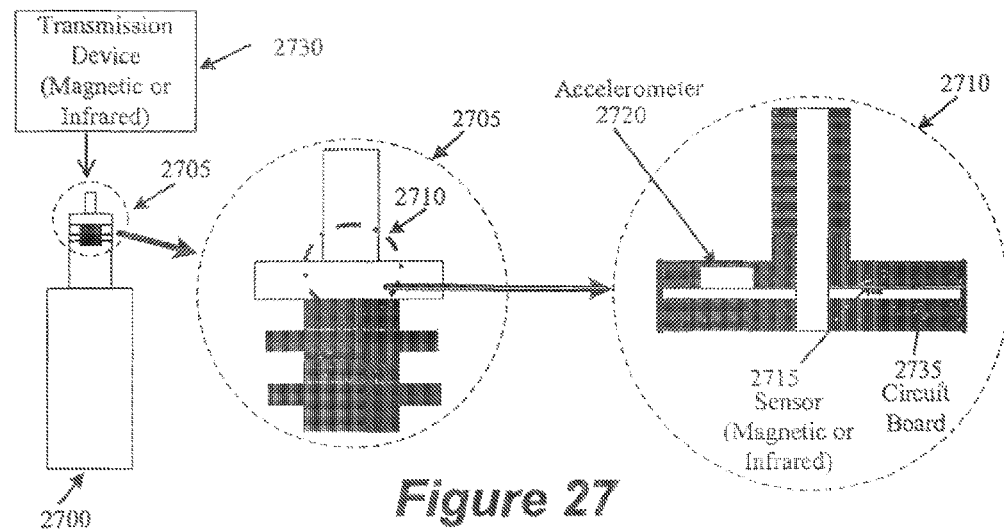
FIG. 27 illustrates some embodiments that use an infrared or magnetic sensor that receives signals to change or reprogram the software for a circuit board on a spout.

FIG. 27 illustrates a sensor 2715 attached to a circuit board 2735 located on a spout in some embodiments. Examples of sensor 2715 are magnetic sensors and infrared sensors. Various components on the circuit board 2735, such as an accelerometer 2720, are controlled by software that operates on the circuit board. In some embodiments, the software is changed or reprogrammed through the sensor 2715. In some embodiments, the circuit board 2735 that includes the sensor 2715 is constantly active. In some embodiments, the circuit board 2735 is activated by a sensor 2715, is periodically activated, or is activated by a transmission that includes a coded signal. In some embodiments, a sensor that measures vibrations or acceleration on the circuit board 2735, such as the accelerometer 2720, recognizes a specific pattern of vibrations in order to activate the sensor 2715.

An outside transmission source 2730 is used to transmit modulated patterns which activate and can change the firmware/software on the circuit board 2735. In some embodiments, the outside transmission source transmits using infrared or magnetic signals. Data from the outside communication device 2730 is transmitted to the activated sensor 2715 on the circuit board 2735.

Figure 30:
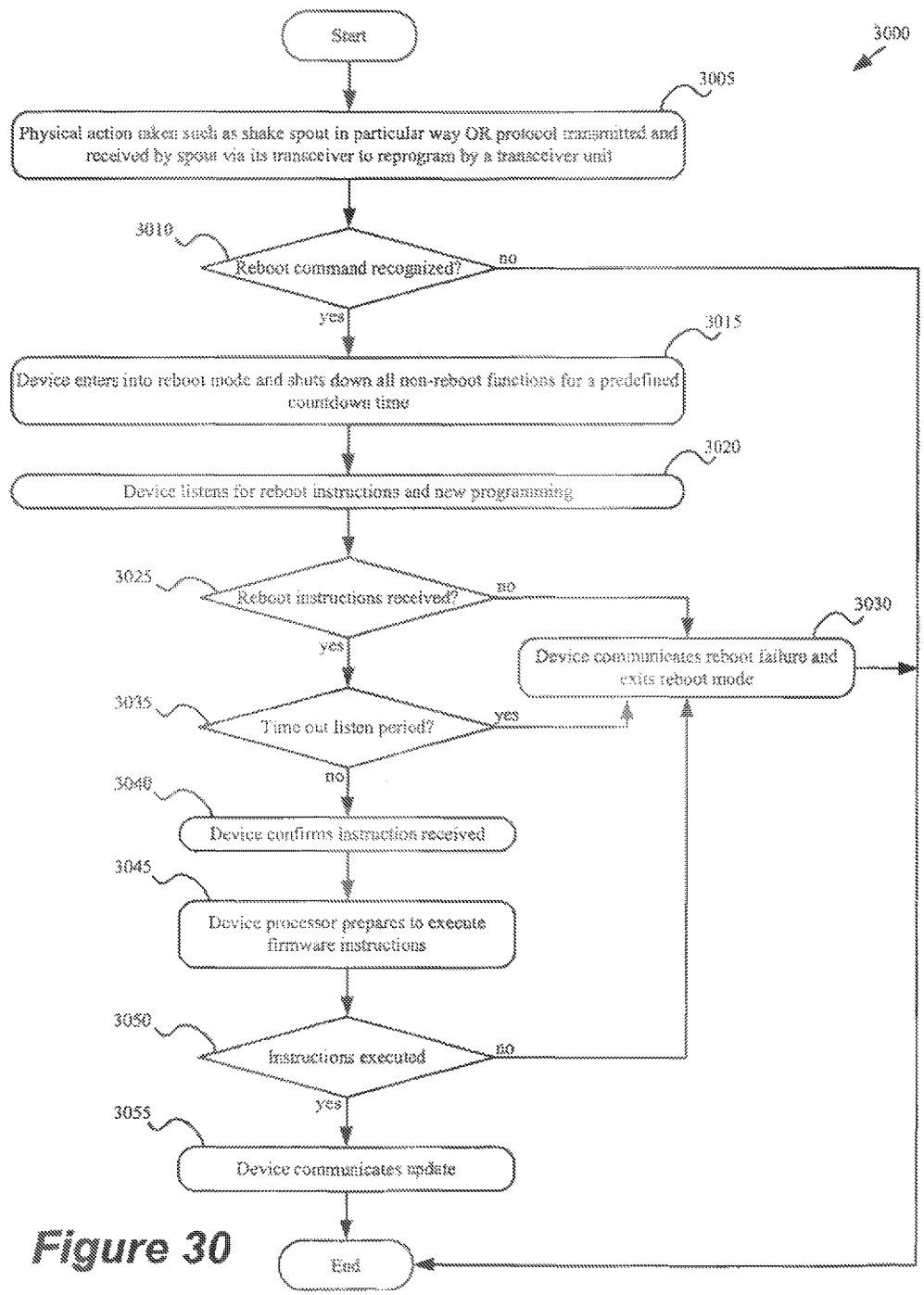
FIG. 30 conceptually illustrates a process of some embodiments for changing or reprogramming the software for a circuit board on a spout.

FIG. 30 conceptually illustrates a logical process 3000 by which a spout receives new programming in some embodiments. The process (at 3005) detects certain physical manipulations of the spout, such as the spout being shaken or the spout's pressure contact switch being pressed in rapid succession. In some embodiments, the spout must continue to be manipulated for some period of time until the action is recognized by a firmware bootloader as a request by the spout to update the spout's firmware. In other embodiments, where the spout has bidirectional communication capabilities, a firmware update can be initiated through a transmission by a communication device or transceiver of a firmware change request.

The process determines (at 3010) whether the spout has sent a reboot command. When the spout's reboot command is not recognized (at 3010) then the process ends. When the spout's reboot command is recognized (at 3010) then the process activates (at 3015) a countdown timer of the spout and stops all other activities of the spout, such as dispensing materials, etc. These activities remain stopped while the process listens (at 3020) for reboot instructions to be received at the spout for the duration of the countdown. In some embodiments, the reboot instructions are received from the central computer system. In other embodiments, the reboot instructions are received from a handheld device, or from some other computer system.

When reboot instruction are not received (at 3025) by the spout during the countdown, the process sends (at 3030) a communication of a reboot failure from the spout and the spout goes back to its previous state of activation, and the process ends. When reboot instructions are received (at 3025) by the spout during the countdown, the process checks (at 3035) the countdown timer. When the countdown timer has expired before the spout receives the reboot instructions, the process sends (at 3030), from the spout, a communication of a reboot failure, the spout goes back to its previous state of activation, and the process ends. When the countdown timer has not expired (at 3035) before the spout receives the reboot instructions, the process sends (at 3040) a communication from the spout that the reboot instructions have been received. The process executes (at 3045), at the spout's processor, the firmware update instructions. If the instructions are not successfully executed (at 3050), the process sends (at 3030), from the spout, a communication of a reboot failure and the process ends. When the instructions are successfully executed (at 3050), the process sends (at 3055) a communication from the spout that the update was successful and the process ends.

VI. Sonar Method to Measure the Dispensing of Materials from Containers

Figure 28:
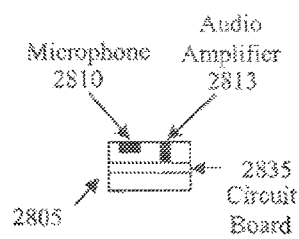
FIGS. 28-29 illustrate some embodiments that use a microphone and audio amplifier attached to the inside of a container to measure the change in volume of material in the container.
Figure 29:
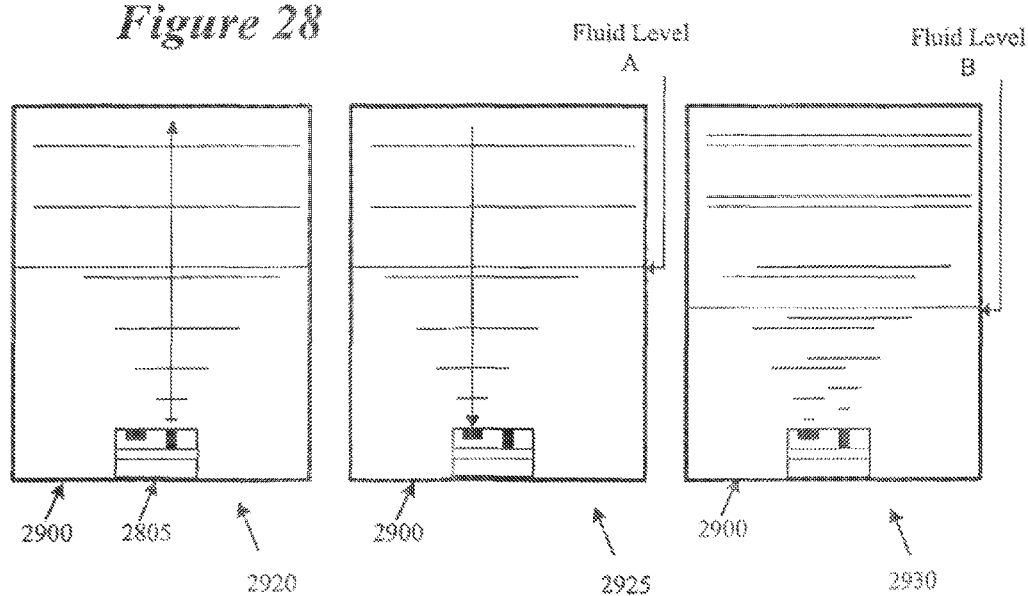

FIG. 28 illustrates a device 2805 that can be attached to the inside of a container (not shown) containing liquids, gels, powders, or solids in some embodiments. As shown the device 2805 includes an audio amplifier 2813 and a microphone 2810 connected to a circuit board 2835. FIG. 29 illustrates the device 2805 attached to the inside of a container 2900 containing liquids, gels, powders, or solids in various embodiments. A sound pulse at a set frequency is transmitted by the audio amplifier 2813 into the container of liquids, gels, powders, or solids. In some embodiments, the frequency is inaudible to human ears. In other embodiments, the volume is undetectable by human ears.

In some embodiments, the fact that a pour has occurred is determined by the device 2805. When liquids, gels, powders, or solids are poured through a flow channel in the container 2900, the sound pulse is distorted by the motions and a sensor, such as the microphone 2810, notes the changes in its measurements. In other embodiments, the fact that a pour has occurred is determined by a motion sensing component such as an accelerometer or tilt switch. In some embodiments, the audio amplifier 2813 and microphone 2810 are combined on a circuit board 2835 with a sensor to measure tilt or angle of inclination or the presence of material in the dispensing channel of the container 2900.

Some embodiments determine the remaining volume using sound pulses reflected from the top of the container. As shown in portion 2920 in FIG. 29, the audio amplifier 2813 transmits sound pulses into the container 2900. As shown in portion 2925, the microphone 2810 can sense the echo of the transmitted pulse off the other end of the container 2900. Sound travels at different speeds through different materials, so the amount of material in the container 2900 can be calculated based on the elapsed time from the initiation of the pulse to the receipt of the pulse.

When the sensor detects a change in tilt or angle of inclination or the presence of material in the dispensing channel of the container 2900 and a return to a non-inclined or non-motion state then the audio amplifier 2813 sends a sound pulse, the reflections of which are received by the microphone 2810, which measures the amount of material remaining in the container 2900. Successive measurements allow for the determination of the depletion of liquid, gel, powder, or solid with each physical change/movement of the container 2900. As shown in portion 2930, the level of material in the container has dropped from 2925. This change is determined by the difference in the time a pulse takes to return to the microphone 2810 through the material and through the air above the material.

In other embodiments, the sound pulse from the audio amplifier 2813 reflects off the interface between the liquid and the air. The device measures the time between audio amplifier 2813 sending the initial sound pulse and the time that the sound reflected from the interface takes to reach the microphone 2810. Given a value for the speed of sound in the particular liquid, the sensor can determine the height of the liquid in the container. If the cross sectional area of the container at all heights is known, the volume remaining in the container can be determined as a function of the height of the remaining liquid. Based on the measurements of the reflected pulse, the volume of liquids, gels, powders, and solids dispensed can be calculated and stored on the circuit board 2835 or transmitted from the circuit board 2835. The inventory tracking computers of some embodiments, and internal processors on the circuit board 2835 of the device in other embodiments, determine the volume dispensed from a pour by subtracting the volume after the pour from the volume before the pour. The audio amplifier 2813 and microphone 2810 can also determine when there is no longer a presence of liquids, gels, powders, or solids.

VII. Resistive Pressure to Measure Fluid Presence and Fluid Flow

Figure 31A:
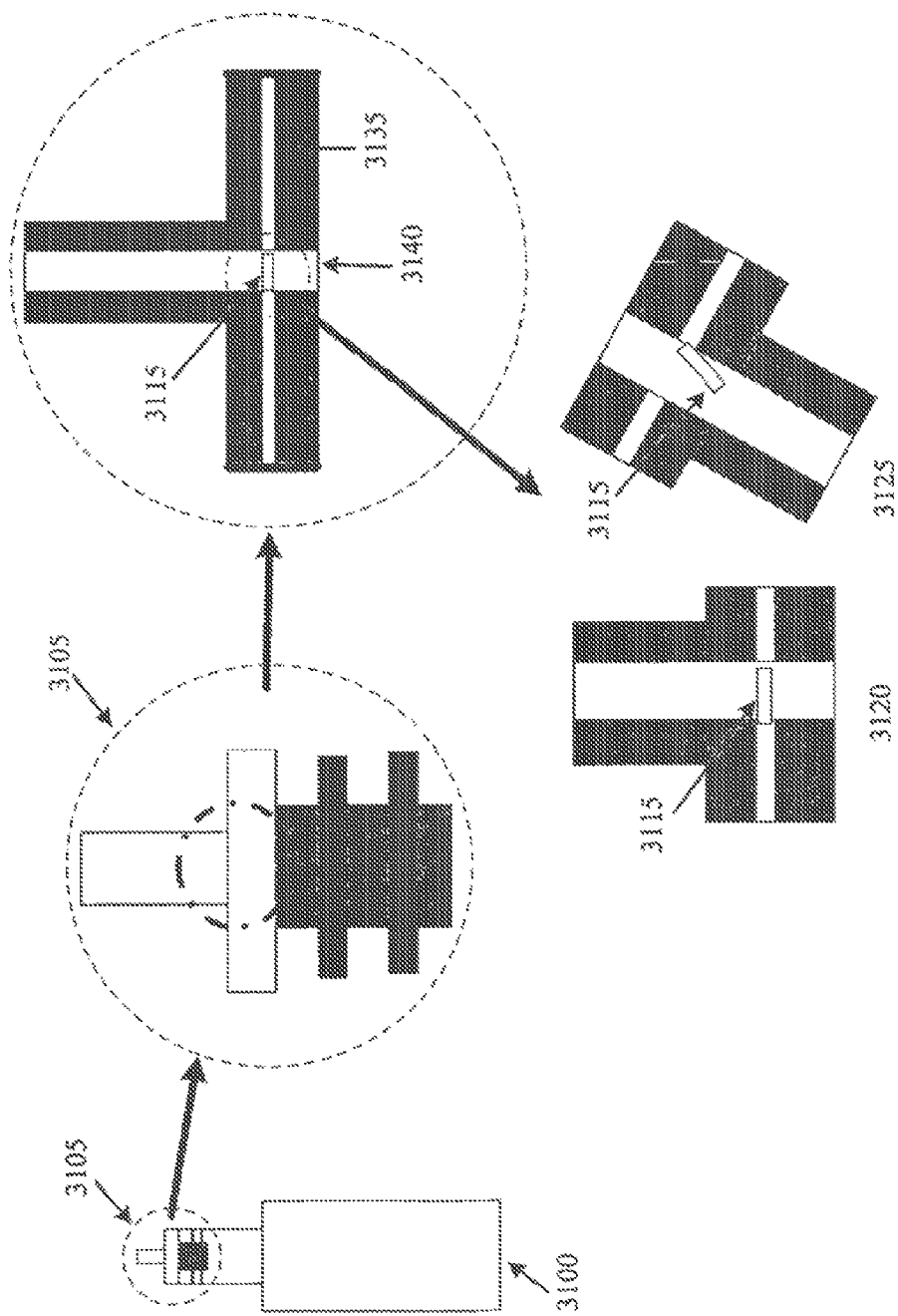
FIGS. 31A-31B illustrate some embodiments that use a physical resistance sensor in the dispensing channel of a container to measure the volume of material dispensed from the container.
Figure 31B:
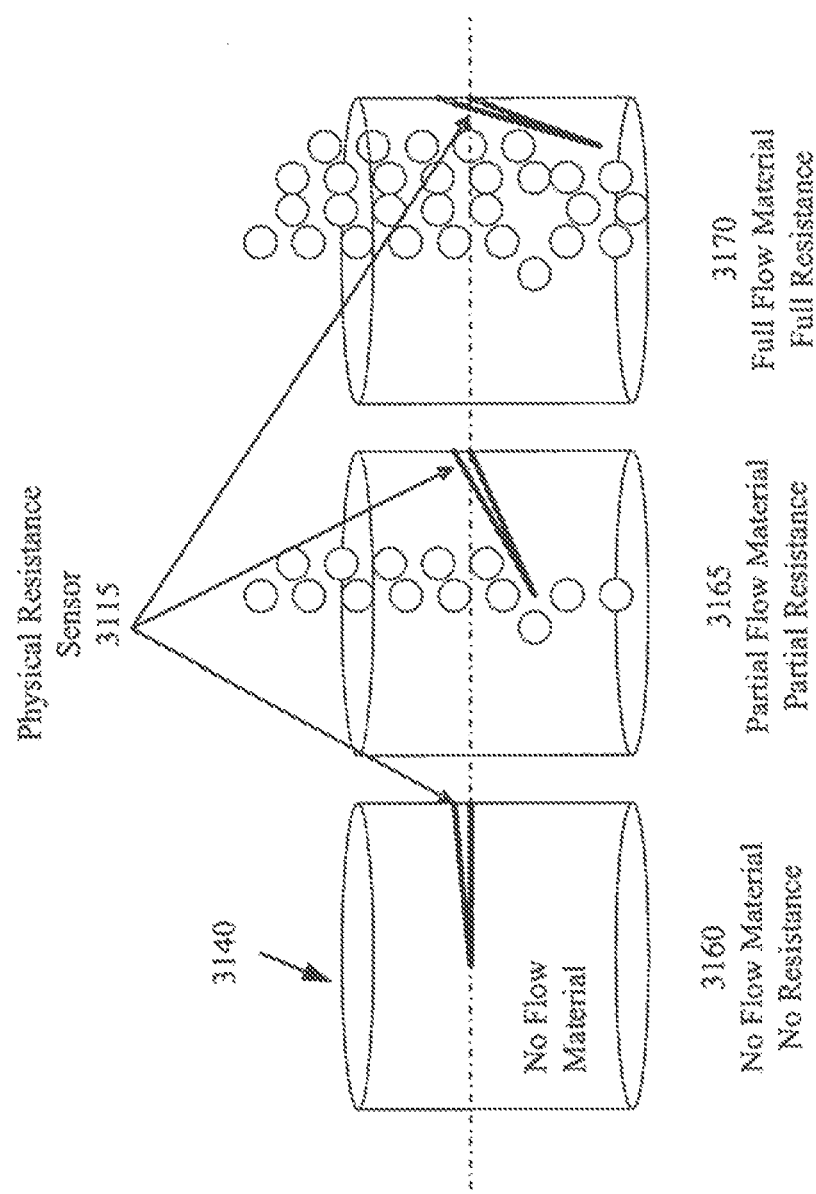

FIGS. 31A-31B illustrate a spout 3105 of some embodiments that uses a physical resistance sensor 3115 to calculate the amount of material, such as a liquid, gel, powder, or solid, dispensed from a container 3100. As shown in FIG. 31A, a spout 3105 on a container 3100 includes a physical resistance sensor 3115 in a dispensing channel 3140 attached to a circuit board 3135. The physical resistance sensor 3115 includes a physical plane or material that is oblique in angle to the dispensing channel in which the liquid, gel, powder, or solid flows out of the container 3100. The material, when being dispensed, presses against the physical resistance sensor 3115. FIG. 31A, in section 3120, shows, the dispensing channel 3140 with physical resistance sensor 3115 when no material is flowing through the dispensing channel 3140 in some embodiments. FIG. 31A, in section 3125, shows container 3100 has been tilted such that material is flowing out through the dispensing channel 3140, and the physical resistance sensor 3115 is in an active state measuring the force placed on it by the material. The physical plane of material will have resistive properties that are known and measurable so that the amount of force exerted on the physical plane can be used to determine the flow rate of liquid, gel, powder, or solid through the dispensing channel 3140. The amount of pressure and the time of the pressure are determined by the physical resistance sensor 3115. The sensor information is combined with the known dimensions of the dispensing channel 3140 such that the flow rate of liquid, gel, powder, or solid is determined.

FIG. 31B illustrates how the flow of material through a dispensing channel 3140 puts force on a physical resistance sensor 3115 and in turn indicates flow rate in some embodiments. As shown, when no material is dispensed (at 3160), the sensor 3115 is at full resistance. When the full flow of material passes (at 3170) through the channel 3140, the sensor 3115 is at zero resistance. Any flow between no flow and full flow creates (at 3165) partial resistance for the sensor 3115. By calibrating the resistance to various materials, the flow rate of the material can be determined.

VIII. Techniques to Reduce Physical Space Requirements in Dispensing Devices

There are several methods of engineering to minimize the overall physical size of any device. Two techniques include the use of flexible electronic circuit boards and the stacking of batteries above or below the plane of an electronic circuit board to reduce overall physical space requirements.

A. Flexible Circuit Boards to Minimize Mechanical Design Size

Figure 32A:
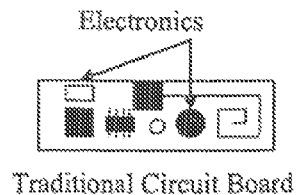
FIGS. 32A-32D illustrate flexible electronics boards used in some embodiments that are used in conjunction with a plastic holder and holding clips to allow for the smallest possible enclosures to house the electronics.
Figure 32B:
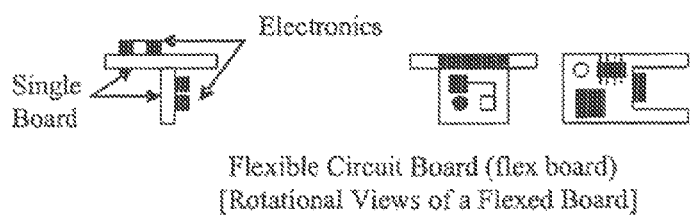
Figure 32C:
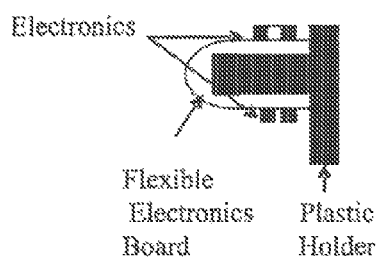
Figure 32D:
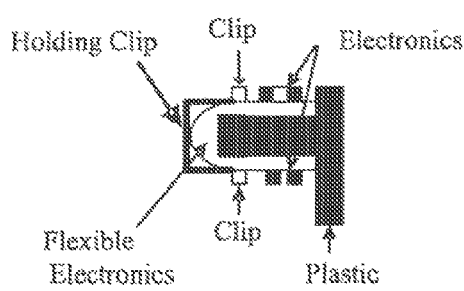

FIGS. 32A-32D illustrate flexible electronics boards that are used in conjunction with a plastic holder and holding clips to allow for the smallest possible enclosures to house the electronics in some embodiments. Minimizing the size of the units enhances the overall mechanical engineering of pour detection devices. FIG. 32A illustrates a traditional, non flexible electronics circuit board which allows for electronics to be mounted on a single plane in some embodiments. FIG. 32B illustrates a simple use of a flexible electronics circuit board (flex board) that can orient electronics on more than one plane in some embodiments. FIG. 32C illustrates how a flexible electronics circuit board (flex board) can be "wrapped" onto a rigid plastic holder to provide a stable platform for the placement and manufacturing of the electronics boards into solid casings in some embodiments. In some embodiments, the circuit board can be held in place through chemical bonding, frictional holds or other holding methods. FIG. 32D illustrates how a flexible electronics circuit board (flex board) can be "wrapped" onto a rigid plastic holder and a supplemental compression holding clip can be used to hold the circuit board onto the plastic holder in some embodiments. In some embodiments, the plastic holder itself can have prong and slot structures that provide the compression to hold the flexible circuit board to the plastic holder.

B. Battery Holder to Minimize Physical Space

Figure 33A:
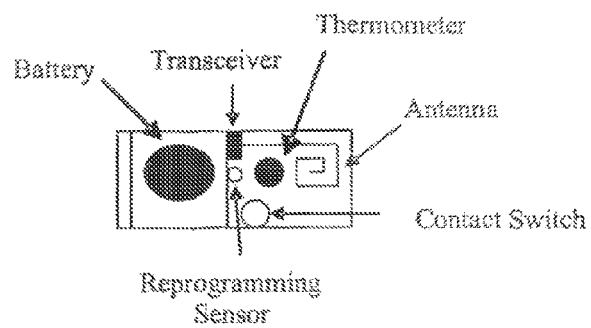
FIGS. 33A-33B illustrate a battery stacked above or below the plane of a circuit board in order to reduce the overall dimensional area needed in engineering in some embodiments.
Figure 33B:
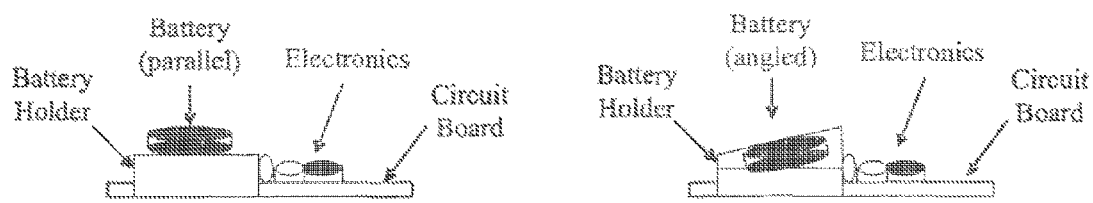

FIGS. 33A-33B illustrate a battery stacked above or below the plane of a circuit board in order to reduce the overall footprint of the devices of some embodiments. FIG. 33A illustrates, in a top down view, how a battery placed on a holding and/or contact bracket can be used to place a battery to power a circuit board above or underneath the circuit board it is to power in some embodiments. FIG. 33B illustrates, in a side view, the same use of a battery orientated in the same general plane of a circuit board or slightly pitched in angular orientation depending on the design requirements of the mechanical engineering in some embodiments.

IX. Computer System

Figure 34:
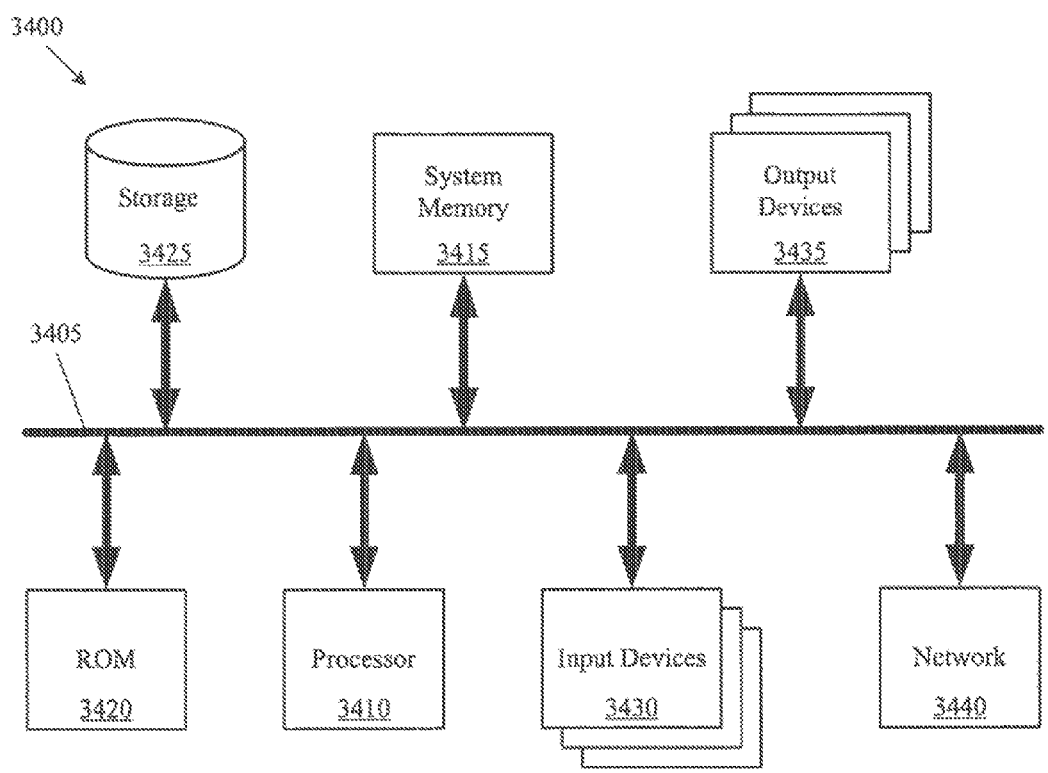
FIG. 34 illustrates a computer system with which some embodiments are implemented.

FIG. 34 illustrates a computer system 3400 with which some embodiments are implemented. Such a computer system includes various types of computer readable mediums and interfaces for various other types of computer readable mediums. Computer system 3400 includes a bus 3405, a processor 3410, a system memory 3415, a read-only memory (ROM) 3420, a permanent storage device 3425, input devices 3430, and output devices 3435. The components of the computer system 3400 are electronic devices that automatically perform operations based on digital and/or analog input signals.

One of ordinary skill in the art will recognize that the computer system 3400 may be embodied in other specific forms without deviating from the spirit of the invention. For instance, the computer system may be implemented using various specific devices either alone or in combination. For example, a cellular phone may include the input and output devices 3430 and 3435, while a remote personal computer ("PC") may include the other devices 3405-3425, with the cellular phone connected to the PC through a cellular network that accesses the PC through its network connection 3440.

The bus 3405 collectively represents all system, peripheral, and chipset buses that communicatively connect the numerous internal devices of the computer system 3400. For instance, the bus 3405 communicatively connects the processor 3410 with the read-only memory 3420, the system memory 3415, and the permanent storage device 3425. From these various memory units, the processor 3410 retrieves instructions to execute and data to process in order to execute the processes of the invention. In some cases, the bus 3405 may include wireless and/or optical communication pathways in addition to or in place of wired connections. For example, the input and/or output devices may be coupled to the system using a wireless local area network (W-LAN) connection, Bluetooth®, or some other wireless connection protocol or system.

The read-only-memory (ROM) 3420 stores static data and instructions that are needed by the processor 3410 and other modules of the computer system. The permanent storage device 3425, on the other hand, is a read-and-write memory device. This device is a non-volatile memory unit that stores instructions and data even when the computer system 3400 is off. Some embodiments use a mass-storage device (such as a magnetic or optical disk and its corresponding disk drive) as the permanent storage device 3425.

Other embodiments use a removable storage device (such as a floppy disk, flash drive, or CD-ROM) as the permanent storage device. Like the permanent storage device 3425, the system memory 3415 is a read-and-write memory device. However, unlike storage device 3425, the system memory is a volatile read-and-write memory, such as a random access memory (RAM). The system memory stores some of the instructions and data that the processor needs at runtime. In some embodiments, the sets of instructions used to implement invention's processes are stored in the system memory 3415, the permanent storage device 3425, and/or the read-only memory 3420.

The bus 3405 also connects to the input and output devices 3430 and 3435. The input devices enable the user to communicate information and select commands to the computer system. The input devices 3430 include alphanumeric keyboards and pointing devices (also called "cursor control devices"). The input devices 3430 also include audio input devices (e.g., microphones, MIDI musical instruments, etc.) and video input devices (e.g., video cameras, still cameras, optical scanning devices, etc.). The output devices 3435 include printers, electronic display devices that display still or moving images, and electronic audio devices that play audio generated by the computer system. For instance, these display devices may display a graphical user interface (GUI). The display devices include devices such as cathode ray tubes (CRT), liquid crystal displays (LCD), plasma display panels (PDP), surface-conduction electron-emitter displays (SED), etc. The audio devices include a PC's sound card and speakers, a speaker on a cellular phone, a Bluetooth® earpiece, etc. Some or all of these output devices may be wirelessly or optically connected to the computer system 3400.

Finally, as shown in FIG. 34, bus 3405 also couples computer 3400 to a network 3440 through a network adapter (not shown). In this manner, the computer can be a part of a network of computers (such as a local area network ("LAN"), a wide area network ("WAN"), or an Intranet, or a network of networks, such as the internet. For example, the computer 3400 may be coupled to a web server (network 3440) so that a web browser executing on the computer 3400 can interact with the web server as a user interacts with a GUI that operates in the web browser.

As mentioned above, the computer system 3400 may include one or more of a variety of different computer-readable media (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, ultra density optical discs, any other optical or magnetic media, and floppy disks. The computer-readable media may store a computer program that is executable by at least one processor and includes sets of instructions for performing various operations.

As used in this specification and any claims of this application, the terms "computer", "server", "processor", and "memory" all refer to electronic or other technological devices. These terms exclude people or groups of people. For example as used in this application "server" is a machine, not a human being who serves some function. For the purposes of this specification, the terms display or displaying mean displaying on an electronic device.

As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It should be recognized by one of ordinary skill in the art that any or all of the components of computer system 3400 may be used in conjunction with the invention. Moreover, one of ordinary skill in the art will appreciate that any other system configuration may also be used in conjunction with the invention or components of the invention.

Though the specification describes various components that work together as being in one or another place on the described devices, one of ordinary skill in the art will realize that in some embodiments, the positions are reversed. For example, the illustrated embodiments of the sliding stems show the magnet on the sliding component and the magnetic sensor and circuit board on the stationary component. However, in some embodiments, the magnet is on the stationary component and the magnetic sensor and circuit board are on the sliding component.

While the invention has been described with reference to numerous specific details, one of ordinary skill in the art will recognize that the invention can be embodied in other specific forms without departing from the spirit of the invention. For example, the monitoring devices shown in this application could include features of the devices described in the concurrently-filed U.S. application Ser. No. 12/688,826, which is incorporated herein by reference. Furthermore, some embodiments of the processes conceptually illustrated herein may omit certain operations, combine certain operations, or perform certain operations in a different order than the order shown in the figures.

Furthermore, one of ordinary skill in the art would understand that the invention is not to be limited by the foregoing illustrative details, but rather is to be defined by the appended claims.

What claimed is:

1. A system for monitoring an amount of a dispensed material, comprising:
   a sensor including an accelerometer, the sensor attachable to a container capable of holding a substance, configured to:
      periodically measure, by the accelerometer, a plurality of exact incremental angular orientations of the container;
      determine whether a measured angular orientation of the container by the accelerometer is within a predefined angle range;
      perform the periodic measurements according to a first non-zero measurement frequency when the measured angular orientation of the container is within the angle range; and
      perform the periodic measurements according to a second non-zero measurement frequency when the measured angular orientation of the container is outside of the angle range.

2. The system of claim 1, further comprising a processor configured to:
   for each of the periodic measurements performed according to the first non-zero measurement frequency, generate a measured angle comprising an angular value of the measurement and a time indication of when the measurement was taken; and
   calculate the volume of the substance dispensed from the container based on the generated measured angles.

3. The system of claim 1, wherein:
   the substance comprises a liquor;
   the container comprises a liquor bottle; and
   the sensor is integral to a liquor pouring spout, wherein the liquor pouring spout is attachable to and removable from the liquor bottle.

4. The system of claim 2, further comprising:
   a monitoring station is located remotely from the container, wherein the processor is internal to the monitoring station; and
   wherein the sensor is further configured to transmit the periodic measurements performed according to the first non-zero measurement frequency to the monitoring station.

5. The system of claim 1, further comprising a processor attachable to the container communicatively coupled with at least one of the sensor and a monitoring station, the processor configured to:
   calculate the volume of the substance dispensed from the container based on the measured plurality of exact incremental angular orientations within the first angle range, wherein the calculation of the volume is performed prior to the transmission of the data to the monitoring station.

6. The system of claim 5, wherein the processor is further configured to calculate the volume of the substance dispensed from the container based on the measured plurality of exact incremental angular orientations and a corresponding plurality of recorded times.

7. A method for determining the amount of a dispensed material, comprising:
   periodically measuring, by a sensor, a plurality of exact incremental angular orientations of a container;
   determining that:
      (i) a measured angular orientation by the sensor of the container is within an angle range, and in response to determining that the measured angular orientation of the container is within the angle range, causing the sensor to perform the periodic measurements according to a first non-zero measurement frequency that is different from a second non-zero measurement frequency, or
      (ii) the measured angular orientation by the sensor of the container is not within the angle range, and in response to determining that the measured angular orientation of the container is not within the angle range, causing the sensor to perform the periodic measurements according to the second non-zero measurement frequency; and
   determining, by a processor, an amount of a substance dispensed based on the exact incremental angular orientations within the angle range and a duration of time the container remains at each of the exact incremental angular orientations within the angle range.

8. The method of claim 7, wherein the step of determining comprises:
   calculating, by the processor, the total volume of the substance dispensed from the container based on the exact incremental angular orientations within the angle range and a duration of time the container remains at each of the exact incremental angular orientations.

9. The method of claim 7, further comprising:
   determining a flow rate for the substance out of the container for each of the exact incremental angular orientations within the angle range.

10. The system of claim 1, wherein the first non-zero measurement frequency is greater than the second non-zero measurement frequency.

11. The system of claim 1, wherein the second non-zero measurement frequency is greater than the first non-zero measurement frequency.

12. The system of claim 11, further comprising a processor configured to:
   for each of the periodic measurements performed according to the second non-zero measurement frequency, generate a measured angle comprising an angular value of the measurement and a time indication of when the measurement was taken; and calculate the volume of the substance dispensed from the container based on the generated measured angles.

* * * * *